US011734458B2

(12) United States Patent
Smith

(10) Patent No.: US 11,734,458 B2
(45) Date of Patent: Aug. 22, 2023

(54) EXTENSIBLE LAYERED TRUSTED COMPUTING BASE FOR COMPUTING DEVICES

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 16/800,748

(22) Filed: Feb. 25, 2020

(65) Prior Publication Data

US 2020/0193065 A1    Jun. 18, 2020

Related U.S. Application Data

(60) Provisional application No. 62/833,163, filed on Apr. 12, 2019, provisional application No. 62/810,571, filed on Feb. 26, 2019.

(51) Int. Cl.
*G06F 21/71* (2013.01)
*H04L 9/06* (2006.01)
*G06F 21/73* (2013.01)

(52) U.S. Cl.
CPC .............. *G06F 21/71* (2013.01); *G06F 21/73* (2013.01); *H04L 9/0662* (2013.01); *G06F 2221/2149* (2013.01)

(58) Field of Classification Search
USPC ........ 713/189, 150, 163, 181; 726/2, 21, 36; 380/255, 264, 276
See application file for complete search history.

(56) References Cited

U.S. PATENT DOCUMENTS 4,881,263 A * 11/1989 Herbison ................ H04L 9/083
                                                      380/43
5,235,644 A *  8/1993 Gupta ...................... H04L 29/02
                                                      713/161

(Continued)

OTHER PUBLICATIONS

"DICE: Device Identifier Composition Engine", https: www.microsoft.com en-us research project dice-device-identifier-composition-engine Accessed on Jun. 10, 2020, (Jan. 1, 2015), 8 pgs.

(Continued)

*Primary Examiner* — Sharif E Ullah
(74) *Attorney, Agent, or Firm* — Schwegman Lundberg & Woessner, P.A.

(57) ABSTRACT

Systems and methods for implementing a Device Identifier Composition Engine (DICE)-based trusted computing base architecture, among various hardware, firmware, and software layers, are described. In an example, attestation and security operations may be supported in a multi-layered approach, by operations to: obtain a component identifier from a particular layer of at least one operational layer in a computing system; obtain a first compound device identifier, produced as an attestation value at a lower layer; and process, with a function, the component identifier from the particular layer and the first compound device identifier from the lower layer, to produce a second compound device identifier. In various examples, the second compound device identifier indicates attestation of at least one layer located at or below the particular layer.

24 Claims, 19 Drawing Sheets

(56) References Cited

U.S. PATENT DOCUMENTS

| | | | | |
|---|---|---|---|---|
| 7,386,725 | B2* | 6/2008 | Jinmei | H04L 63/20 |
| | | | | 713/171 |
| 7,765,329 | B2* | 7/2010 | Cruciani | H04L 67/1097 |
| | | | | 370/395.5 |
| 7,879,111 | B2* | 2/2011 | Hardacker | H04W 12/04 |
| | | | | 380/52 |
| 8,498,417 | B1* | 7/2013 | Harwood | H04L 67/1097 |
| | | | | 713/193 |
| 8,850,190 | B2* | 9/2014 | Li | H04L 9/321 |
| | | | | 726/3 |
| 9,467,283 | B2* | 10/2016 | Buckley | H04L 9/14 |
| 9,519,696 | B1* | 12/2016 | Roth | G06F 16/258 |
| 9,774,445 | B1* | 9/2017 | Gandhasri | H04L 9/08 |
| 9,882,713 | B1* | 1/2018 | Raza | H04L 9/0825 |
| 10,318,754 | B2* | 6/2019 | Yavuz | G06F 21/6227 |
| 10,331,895 | B1* | 6/2019 | Roth | G06F 21/6209 |
| 10,333,696 | B2* | 6/2019 | Ahmed | H04L 9/006 |
| 10,361,859 | B2* | 7/2019 | Clark | G06F 16/182 |
| 10,452,384 | B2* | 10/2019 | England | G06F 8/65 |
| 10,546,130 | B1* | 1/2020 | Chaney | G06F 16/2477 |
| 10,678,938 | B2* | 6/2020 | Agerstam | G06F 21/6218 |
| 10,756,887 | B2* | 8/2020 | Shemer | H04L 9/085 |
| 10,869,190 | B2* | 12/2020 | Mondello | G06Q 20/0855 |
| 10,917,230 | B2* | 2/2021 | Feng | G06F 21/53 |
| 11,088,821 | B2* | 8/2021 | Troia | H04W 4/44 |
| 11,101,984 | B2* | 8/2021 | Duval | G06F 21/79 |
| 2003/0196115 | A1* | 10/2003 | Karp | H04L 63/0236 |
| | | | | 709/227 |
| 2003/0229789 | A1* | 12/2003 | Morais | H04L 9/3213 |
| | | | | 713/181 |
| 2004/0103220 | A1* | 5/2004 | Bostick | G06F 3/067 |
| | | | | 709/208 |
| 2014/0115689 | A1* | 4/2014 | Lee | G06F 21/53 |
| | | | | 726/16 |
| 2015/0058913 | A1* | 2/2015 | Kandasamy | H04L 63/061 |
| | | | | 726/1 |
| 2017/0264439 | A1* | 9/2017 | Muhanna | H04L 9/3273 |
| 2017/0337140 | A1* | 11/2017 | Ragupathi | H04L 63/0428 |
| 2019/0042779 | A1* | 2/2019 | Agerstam | G06F 21/554 |
| 2019/0109713 | A1* | 4/2019 | Clark | H04L 9/3239 |
| 2019/0140919 | A1* | 5/2019 | Smith | H04L 9/50 |
| 2019/0207917 | A1* | 7/2019 | Tasher | G06F 12/1441 |
| 2019/0230002 | A1* | 7/2019 | Bernat | G06F 21/57 |
| 2019/0268335 | A1* | 8/2019 | Targali | H04L 9/0643 |
| 2020/0119929 | A1* | 4/2020 | Edwards | H04L 9/3265 |
| 2020/0193065 | A1* | 6/2020 | Smith | H04L 9/3242 |
| 2020/0205067 | A1* | 6/2020 | Liu | H04W 16/18 |
| 2020/0233963 | A1* | 7/2020 | Hamamoto | G06F 21/57 |
| 2020/0278838 | A1* | 9/2020 | Hill | H04L 9/0643 |
| 2020/0374700 | A1* | 11/2020 | Smith | H04L 63/102 |
| 2021/0075627 | A1* | 3/2021 | Hathorn | H04L 9/3273 |
| 2021/0091943 | A1* | 3/2021 | Hathorn | H04L 9/0894 |
| 2021/0091944 | A1* | 3/2021 | Hathorn | H04L 9/0891 |
| 2022/0350876 | A1* | 11/2022 | Vasudevan | G06F 8/315 |

OTHER PUBLICATIONS

"Hardware Requirements for a Device Identifier Composition Engine", Family 2.0Level 00 Revision 78, (Mar. 22, 2018), 12 pgs.

"Foundational Trust for IoT and Resource Constrained Devices", https: trustedcomputinggroup.org wp-content uploads Foundational-Trust-for-IOT-and-Resource-Constrained-Devices.pdf Accessed on Jun. 10, 2020, (2017), 3 pgs.

"DICE", https: trustedcomputinggroup.org work-groups dice-architectures , (Accessed by Jun. 11, 2020), 2 pgs.

England, Paul, "A Foundation for Trust in the Internet of Things", Microsoft Corporation, (Apr. 21, 2016), 17 pgs.

Guerra, Maria, "What is DICE architecture?", https: www.microcontrollertips.com what-is-dice-architecture-faq Accessed on Jun. 10, 2020, (Jun. 27, 2018), 9 pgs.

Hardjono, Thomas, "Decentralized Trusted Computing Base for Blockchain Infrastructure Security", Cornell University arXiv.org cs arXiv:1905.04412, (Mar. 19, 2019), 27 pgs.

Sangster, Paul, "Virtualized Trusted Platform Architecture Specification", Specification Version 1.0Revision0.26TCG Published, (Sep. 27, 2011), 60 pgs.

Yousefpour, Ashkan, "All One Needs to Know about Fog Computing and Related Edge Computing Paradigms", Journal of Systems Architecture, (Aug. 2018), 49 pgs.

Zic, John, "Towards a cloud-based integrity measurement service", Journal of Cloud Computing: Advances, Systems and Applications, (2013), 9 pgs.

* cited by examiner

LAYERED TCB: ASYMMETRIC KEYS

LAYERED TCB: SYMMETRIC KEYS

EXTENSIBLE LAYERED TRUSTED COMPUTING BASE FOR COMPUTING DEVICES

PRIORITY CLAIM

This application claims the benefit of priority to U.S. Provisional Application Ser. No. 62/833,163, filed Apr. 12, 2019, and to U.S. Provisional Application Ser. No. 62/810,571, filed Feb. 26, 2019, both of which are incorporated herein by reference in their entirety.

TECHNICAL FIELD

Embodiments described herein generally relate to security and processing techniques used with data communications and interconnected device networks, and in particular, to security and processing techniques applied within computing devices such as internet of things (IoT) and edge computing devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF). Further standards that specify security requirements and approaches for IoT and distributed device settings are also being proposed by the Trusted Computing Group (TCG).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
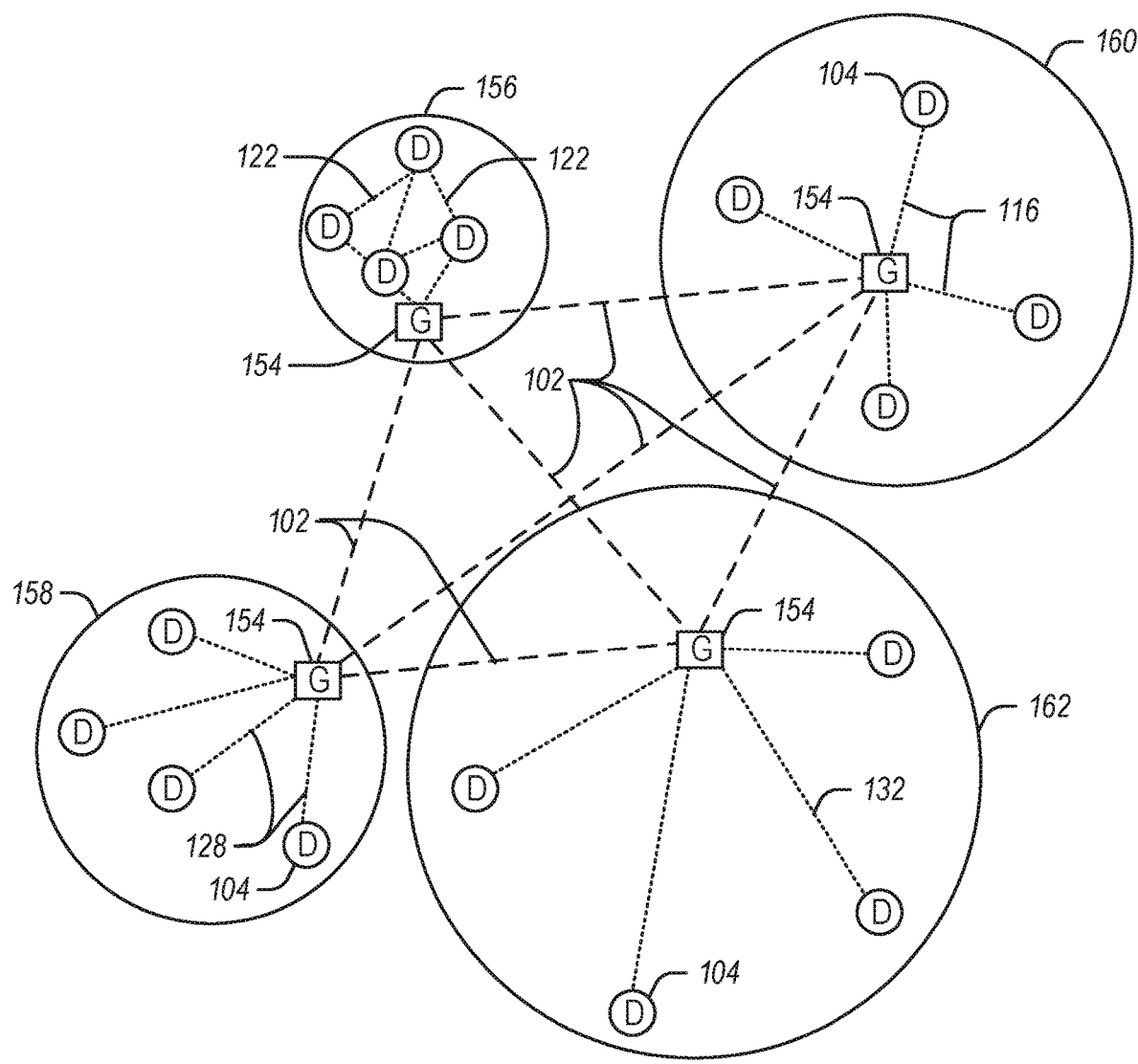
FIG. 1 illustrates a domain topology for respective internet-of-things (IoT) networks coupled through links to respective gateways, according to an example.

In the following description, methods, configurations, and related apparatuses are disclosed for the processing of security contexts in a computing device) interconnection setting. These security contexts are enabled through the use of various hardware components with security approaches enabled by a Trusted Computing Group (TCG) Device Identifier Composition Engine (DICE) implementation.

The following security contexts may involve security operations performed among multiple layers of hardware in a distributed trusted computing base (TCB) architecture. The multiple layers may be implemented among hardware components of architectures such as Intel Software Guard Extensions (SGX), ARM TrustZone, Co-processors, or other types of devices and components. As a result, the following techniques for enabling and using a distributed TCB (also referred to as an "extensible" or "layered" TCB) may be applicable to a variety of hardware implementations, including with constrained Edge and IoT computing devices.

The following also describes an architecture in which a DICE-layered TCB device is configured to support security operations (including enrollment and attestation) using a layered TCB architecture. The security operations among the multiple layers may be performed with both asymmetric keys and symmetric keys. Specific techniques of certificate enrollment involving multiple external or multiple embedded certificate authorities (issuers) using the layered TCB are disclosed. Further, an attestation architecture and use cases (involving implicit attestation and explicit attestation examples) are also disclosed, including with examples in which a Verifier is able to evaluate attestation evidence generated by the layered TCB endpoint (i.e., the Attester) having potentially multiple certificate issuers and manifest signers.

Overview of DICE and Trusted Computing Base

The TCG standards group has defined DICE as a trusted hardware building block for generating cryptographic device identities and attestation using the identities. The hardware implementing DICE is the first layer of a layered TCB architecture. Subsequent TCB layers can be dynamically added or removed to fallback to a trusted state. TCB layers may be added during manufacturing and later at or during deployment. A layered TCB approach, referenced herein, seeks to identify and use the most essential trusted computing components implementable in hardware and whose implementation is verifiably correct.

In an example, the layered TCB architecture provides an extension to a standard TCB approach for security and attestation. This follows the pattern of a trusted platform module (TPM) secure cryptoprocessor, which utilizes a root of trust that extends a platform configuration register (PCR) in a TPM, to transition to another module, and so on, as the secure state can be ultimately communicated to external party, providing attestation throughout the computing system. The presently described layered TCB architecture extends this concept by enabling each layer of software that executes in the computing system to be part of the trusted computing base, even as each layer has its own ability to generate keys that can directly attest to its state.

As discussed in the following examples, each layer is fully capable of performing duties that are needed to perform attestation, or to use keys that have attestable semantics. From this, a peer entity is able to, based on the key, determine that the endpoint is composed of a sequence of software layers that go back to a hardware root of trust. Among other benefits, this approach allows for TCB modularity to support resiliency. For example, a cyber-resilient TCB feature may include functionality for sending periodic 'liveness' beacons or may implement latches that force a particular sequence to assets that may be updated such as audit or telemetry logs. Such resiliency enablers a function in a TCB (like an OS kernel) to be treated as a core set of functions; each time function is added, it adds complexity, that can be attested and verified.

With the following layered approach, the context around each added component can be separately analyzed and attested. As a result, if one of the components gets attacked or compromised, then that component can be removed and the remaining TCB functions in a way that is secure. Additionally, this provides a mechanism for rollback to a previous layer, without the need to start over from power reset if a security issue exists. Such attestation and security verification may be extended to the use of accept or deny lists (also known as a "whitelist") for software that can be checked before transitioning among each layer.

Further, the following techniques introduce added resiliency for a TCB, while extending to new types of devices that are feasible to implement. This is accessible by hardware, including for endpoints that are not just hardware devices, but also hardware components themselves—such as components/modules in multicomponent chips, SOCs, or replaceable chip platforms. This may even enable a way to securely add and verify chiplets in a multi-chip package following a DICE-established chain of attestation and verification for each chiplet such that the verifier may determine the various different chiplet suppliers and their security relevant manufacturing practices.

The techniques discussed herein also include reference to certain software architectures that enable security and privacy. In an example implementation, SGX is used to provide an "embedded certificate authority (ECA)" for use in respective devices that use DICE architectures for attestation. In other words, the techniques and systems described here use SGX features to fulfill TCG DICE specifications for attestation. The techniques may be applied in server or client device implementations suitable for a wide range of device types including IoT, Edge and Cloud computing. This enables SGX (and Intel or other manufacturer technology) to be used to onboard devices in a DICE-compliant way with an orchestrator, gateway, domain controller, Radius Server or other network access control or network perimeter enforcement mechanism.

Applicability of Attestation Technologies in IoT and Distributed/Edge Compute Settings Use of the attestation and layered security techniques as discussed herein provides benefits in a variety of edge computing and IoT device scenarios. Among other use cases, such use may enforce security for computing systems which handle multi-tenancy and multi-tenant workloads. Further, existing hardware security modules may be repurposed to implement these attestation and layered security techniques, thereby reducing the cost and technical complexity of adoption.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
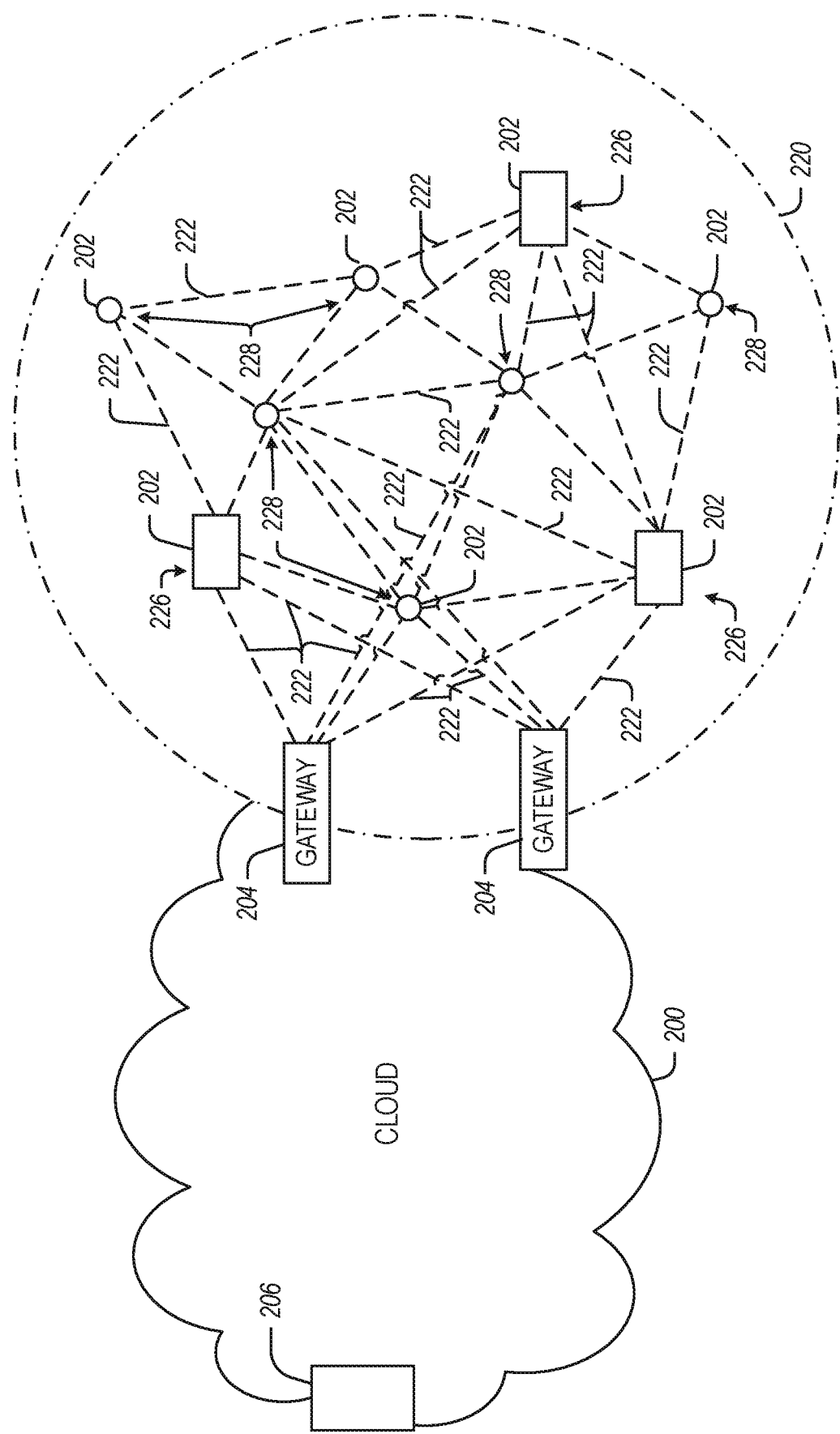
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 4.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog platform may be configured in a declarative programming style, enabling the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device the IoT devices 202, such as particular sensors 228, needed to answer the query. The data from these sensors 228 may then be aggregated and analyzed by any combination of the sensors 228, data aggregators 226, or gateways 204, before being sent on by the fog network 220 to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

In other examples, the operations and functionality described below with reference to FIGS. 5 to 16 may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 3:
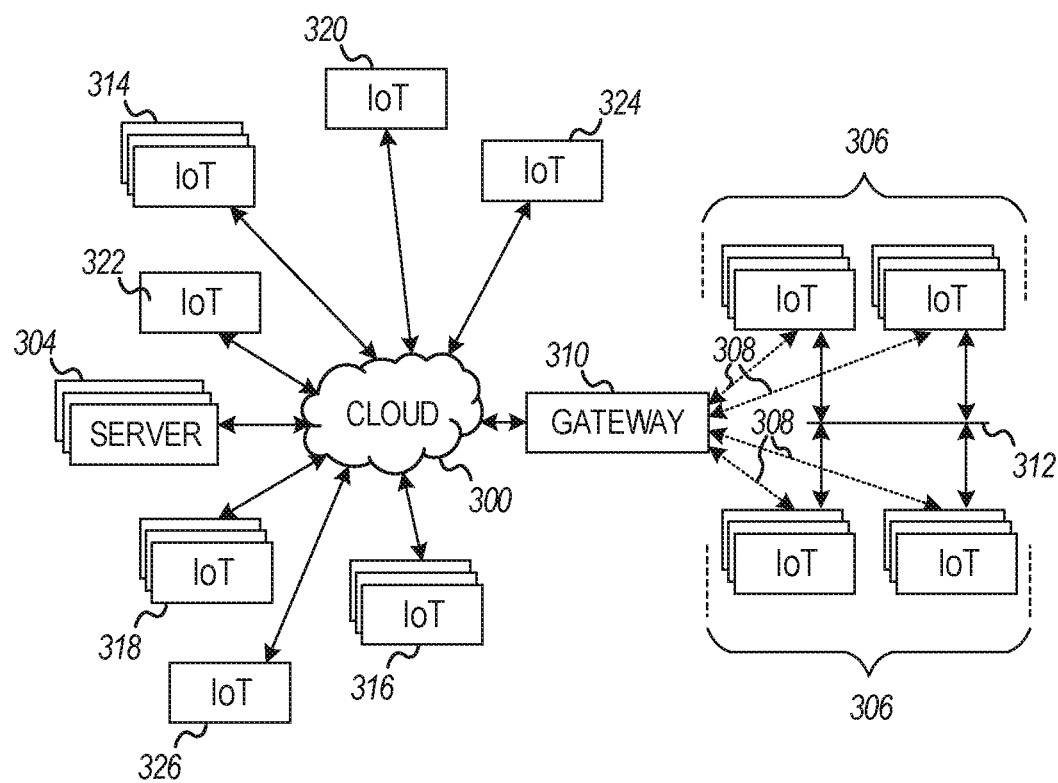
FIG. 3 illustrates a drawing of a cloud computing network, or cloud, in communication with a number of Internet of Things (IoT) devices, according to an example.

FIG. 3 illustrates a drawing of a cloud computing network, or cloud 300, in communication with a number of Internet of Things (IoT) devices. The cloud 300 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 300 through wired or wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 or 328 to communicate with remote locations such as the cloud 300; the IoT devices may also use one or more servers 330 to facilitate communication with the cloud 300 or with the gateway 310. For example, the one or more servers 330 may operate as an intermediate network node to support a local edge cloud or fog implementation among a local area network. Further, the gateway 328 that is depicted may operate in a cloud-to-gateway-to-many edge devices configuration, such as with the various IoT devices 314, 320, 324 being constrained or dynamic to an assignment and use of resources in the cloud 300.

Other example groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, with another IoT fog device or system (not shown, but depicted in FIG. 2), or a combination therein. The groups of IoT devices may be deployed in various residential, commercial, and industrial settings (including in both private or public environments).

As may be seen from FIG. 3, a large number of IoT devices may be communicating through the cloud 300. This may allow different IoT devices to request or provide information to other devices autonomously. For example, a group of IoT devices (e.g., the traffic control group 306) may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 300. This may allow the IoT devices to form an ad-hoc network between the devices, allowing them to function as a single device, which may be termed a fog device or system (e.g., as described above with reference to FIG. 2).

Figure 4:
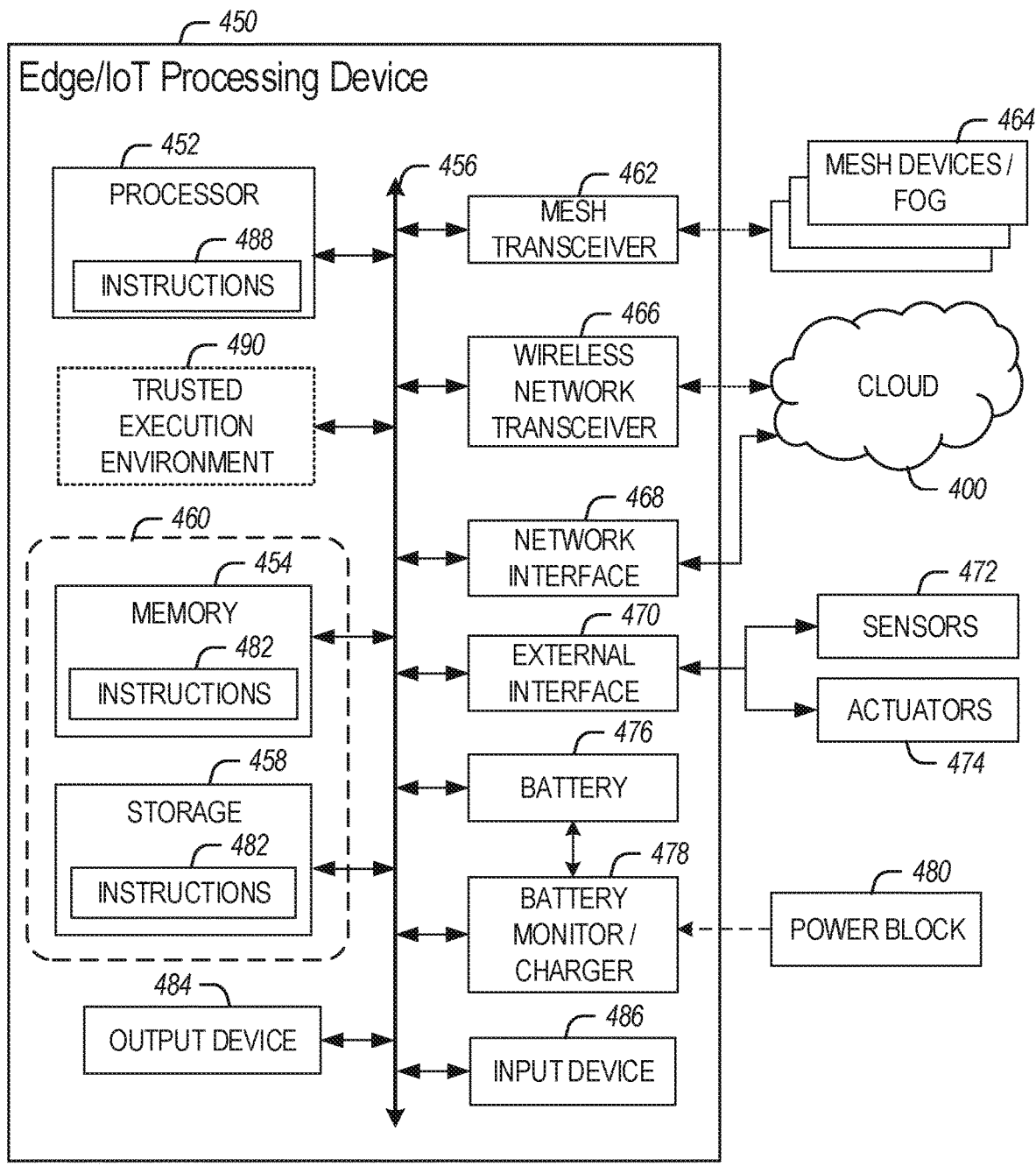
FIG. 4 illustrates a block diagram for an example IoT processing system architecture upon which any one or more of the techniques (e.g., operations, processes, methods, and methodologies) discussed herein may be performed, according to an example.

FIG. 4 is a block diagram of an example of components that may be present in an IoT device 450 for implementing the techniques described herein. The IoT device 450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 450, or as components otherwise incorporated within a chassis of a larger system. Additionally, the block diagram of FIG. 4 is intended to depict a high-level view of components of the IoT device 450. However, some of the components shown may be omitted, additional components may be present, and different arrangement of the components shown may occur in other implementations.

The IoT device 450 may include processing circuitry in the form of a processor 452, which may be a microprocessor, a multi-core processor, a multithreaded processor, an ultra-low voltage processor, an embedded processor, or other known processing elements. The processor 452 may be a part of a system on a chip (SoC) in which the processor 452 and other components are formed into a single integrated circuit, or a single package, such as the Edison™ or Galileo™ SoC boards from Intel. As an example, the processor 452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 452 may communicate with a system memory 454 over an interconnect 456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example the storage 458 may be implemented via a solid state disk drive (SSDD). Other devices that may be used for the storage 458 include flash memory cards, such as SD cards, microSD cards, xD picture cards, and the like, and USB flash drives. In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 462, 466, 468, or 470. Accordingly, in various examples, applicable means for communicating (e.g., receiving, transmitting, etc.) may be embodied by such communications circuitry.

The interconnect 456 may couple the processor 452 to a mesh transceiver 462, for communications with other mesh devices 464. The mesh transceiver 462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 462 may communicate using multiple standards or radios for communications at different range. For example, the IoT device 450 may communicate with close devices, e.g., within about 10 meters, using a local transceiver based on BLE, or another low power radio, to save power. More distant mesh devices 464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 466 may be included to communicate with devices or services in the cloud 400 via local or wide area network protocols. The wireless network transceiver 466 may be a LPWA transceiver that follows the IEEE 802.15.4, or IEEE 802.15.4g standards, among others. The IoT device 450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 462 and wireless network transceiver 466, as described herein. For example, the radio transceivers 462 and 466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 462 and 466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 468 may be included to provide a wired communication to the cloud 400 or to other devices, such as the mesh devices 464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to allow connect to a second network, for example, a NIC 468 providing communications to the cloud over Ethernet, and a second NIC 468 providing communications to other devices over another type of network.

The interconnect 456 may couple the processor 452 to an external interface 470 that is used to connect external devices or subsystems. The external devices may include sensors 472, such as accelerometers, level sensors, flow sensors, optical light sensors, camera sensors, temperature sensors, a global positioning system (GPS) sensors, pressure sensors, barometric pressure sensors, and the like. The external interface 470 further may be used to connect the IoT device 450 to actuators 474, such as power switches, valve actuators, an audible sound generator, a visual warning device, and the like.

In some optional examples, various input/output (I/O) devices may be present within, or connected to, the IoT device 450. For example, a display or other output device 484 may be included to show information, such as sensor readings or actuator position. An input device 486, such as a touch screen or keypad may be included to accept input. An output device 486 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 450.

A battery 476 may power the IoT device 450, although in examples in which the IoT device 450 is mounted in a fixed location, it may have a power supply coupled to an electrical grid. The battery 476 may be a lithium ion battery, or a metal-air battery, such as a zinc-air battery, an aluminum-air battery, a lithium-air battery, and the like.

A battery monitor/charger 478 may be included in the IoT device 450 to track the state of charge (SoCh) of the battery 476. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 478 may communicate the information on the battery 476 to the processor 452 over the interconnect 456. The battery monitor/charger 478 may also include an analog-to-digital (ADC) convertor that allows the processor 452 to directly monitor the voltage of the battery 476 or the current flow from the battery 476. The battery parameters may be used to determine actions that the IoT device 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the IoT device 450. A wireless battery charging circuit, such as an LTC4020 chip from Linear Technologies of Milpitas, Calif., among others, may be included in the battery monitor/charger 478. The specific charging circuits chosen depend on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine readable medium 460 including code to direct the processor 452 to perform electronic operations in the IoT device 450. The processor 452 may access the non-transitory, machine readable medium 460 over the interconnect 456. For instance, the non-transitory, machine readable medium 460 may be embodied by devices described for the storage 458 of FIG. 4 or may include specific storage units such as optical disks, flash drives, or any number of other hardware devices. The non-transitory, machine readable medium 460 may include instructions to direct the processor 452 to perform a specific sequence or flow of actions, for example, as described with respect to the flowchart(s) and block diagram(s) of operations and functionality depicted above.

Also, in a specific example, the instructions 488 on the processor 452 (separately, or in combination with the instructions 488 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 450 through the TEE 490 and the processor 452.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Trusted Computing Base (TCB) Layering

Given a user deployment focus on trustworthy Edge and Cloud computing, use of trusted computing techniques that include hardware roots-of-trust and TCB layering may be developed to serve an important security role. As Edge and Cloud ecosystems become more democratized and complex, reliance on distributed trust becomes essential. Attestation via distributed trust is a mechanism whereby verifiers, such as the entity fulfilling an SLA contract and the user community they represent, seek to manage risk associated with automation complexity and ecosystem diversity.

By incorporating principles of trusted computing into a distributed TCB architecture, many of the challenges facing application developers seeking predictable deployment in Edge and Cloud environments can be modularized for ubiquitous availability and relied up for consistent trusted computing behavior. The following provides principles of deploying secure distributed TCB architectures among multiple layers of TCB components, and specific implementations of enrollment and attestation using such distributed TCB architectures.

Figure 5:
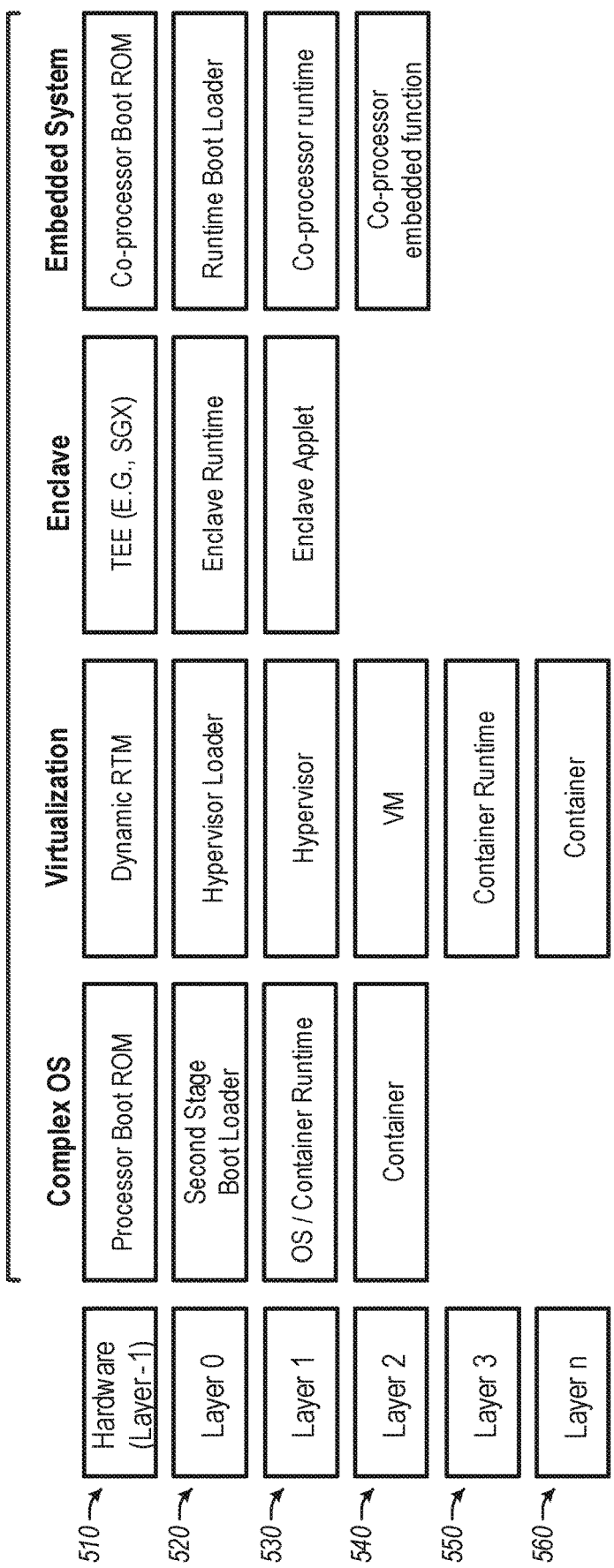
FIG. 5 illustrates examples of layers, upon which any one or more of the techniques (e.g., operations, processes, methods, and methodologies) discussed herein may be performed, according to an example.

FIG. 5 illustrates examples of layers, upon which any one or more of the distributed TCB techniques (e.g., operations, processes, methods, and methodologies) discussed herein may be performed. As shown, various types of components (a complex OS, Virtualization platform, Enclave platform, or Embedded system) include a variety of layers, which are separated into hardware (Layer–1 510) and higher abstraction layers (Layers 0 to N, shown as layers 520, 530, 540, 550, 560, which may include layers of firmware, software, etc.). As detailed in the examples of FIGS. 6 to 11C, a distributed TCB architecture may be adapted among any of these components to perform security enrollment and attestation, including in a DICE-compliant manner.

Figure 6:
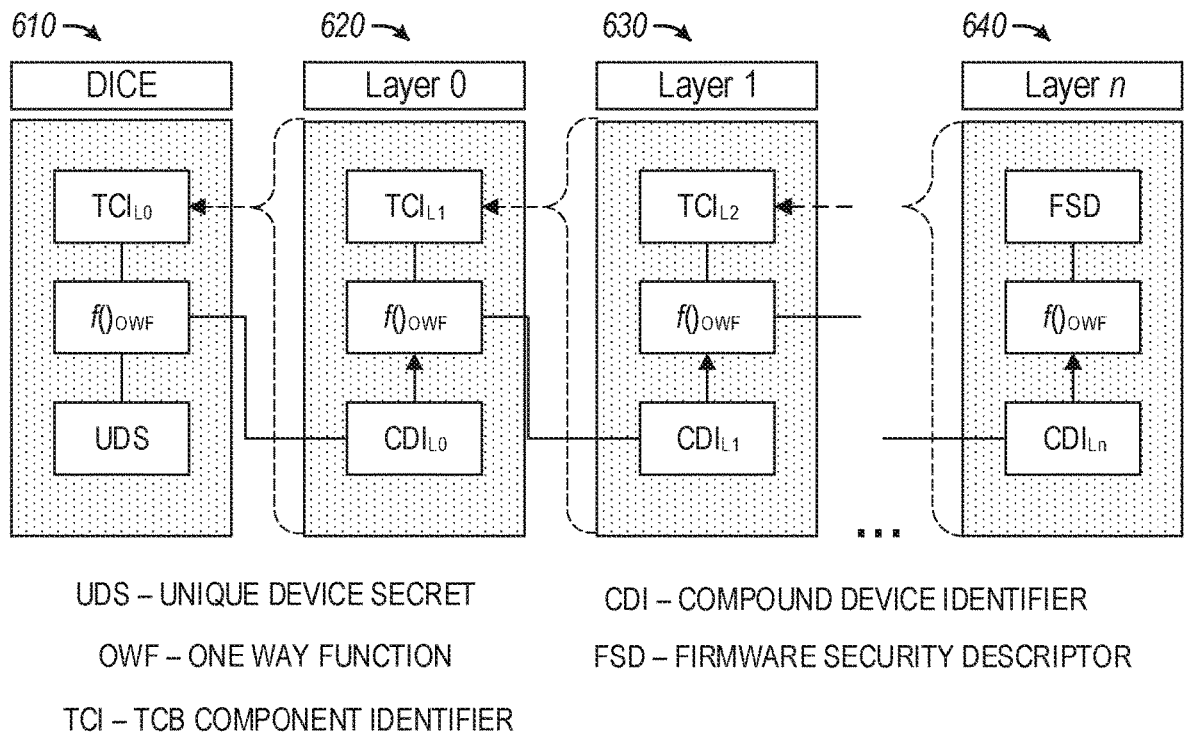
FIG. 6 illustrates an extensible, layered trusted computing base (TCB) using security operations performed with a Device Identifier Composition Engine (DICE) architecture, according to an example.

FIG. 6 illustrates security operations performed in layers of a DICE architecture. Specifically, FIG. 6 shows generic operations among layers (at hardware layer–1 610 and operational layers 0 to n, as depicted in layers 620, 630, 640) being performed within the TCB environment. A layered TCB architecture uses a constrained set of TCB capabilities to construct a next-layer TCB. TCB capabilities are assumed to be protected within a hardened execution environment. Interactions that cross TCB layers are assumed to be protected using interaction capabilities trusted by both TCB layers. As an example, a layer may involve SGX enclaves that trust processor instructions, CPU registers and L0 cache that may be involved in processing SGX instructions. Or, as an example, a layer may involve an FPGA that implements a boot executive in a region of the FPGA that is isolated from subsequent layer TCBs and user 'designs' that are dynamically provisioned.

TCB capabilities exist either in hardened execution environments or during early boot stages in which they are in complete control of system execution. To support this, a manufacturer can describe TCB protection properties using manufacturer-issued attestation certificates and manifests. The diagram in FIG. 6 identifies respective TCB environments at the respective layers 610, 620, 630, 640. Inter-TCB communication may require implementation specific hardening to avoid possible man-in-the-middle attacks and to detect compromise to a layer n+1 TCB by Layer n.

In an example, the capabilities of the respective TCB layers (e.g., layers 610, 620, 630, 640) have trusted access to the following TCB capabilities:

(1) TCB Component Identifier (TCI). The TCI is a component-specific identity and describes the component TCB. Examples of TCI values include (i) a hash computed over runtime code that executes in shielded locations, (ii) a code measurement combined with either a product identifier (e.g., vendor-model-version or a vendor-model-SVN), or (iii) a hash of an FPGA bitstream that can be loaded into programmable hardware. Any component TCB that includes firmware must include measurement of said firmware in its TCI value. Any change to a component TCB must result in a different TCI value. A given layer n should use a trustworthy mechanism for computing the TCI value corresponding to layer n+1.

(2) Compound Device Identifier (CDI). The CDI value received by a layer n is based on two input values: (i) the previous CDI value ($CDI_{Ln-1}$) and (ii) the TCI of the target TCB component ($TCI_{Ln}$). The input values are combined using a one-way function (OWF). Additional values may be included in a CDI computation for a given layer. The Unique Device Secret (UDS) supplies a statistically unique value to the DICE HRoT layer (e.g., layer 610) since no previous context exists. At layers above the DICE HRoT layer (e.g., layers 620, 630, 640), the CDI value received from the previous TCB component supplies a statistically unique value to the current TCB component. A component should use a trustworthy mechanism for provisioning the CDI value of a subsequent component. A CDI value also contains a measurement of component TCB firmware (if present). In various examples, a TCB may utilize multiple CDI values to isolate and manage multiple resources. For example, an encrypted filesystem may use a CDI that derives data storage keys only. A second CDI may be used to derive keys for attestation only. A third key may be used for protecting management control messages only, and the like.

(3) One-way Function (OWF) provides a cryptographic pseudo-random function (PRF). The PRF accepts seed (s) and data (x) values. The seed and data values for subsequent components are the CDI value received from the previous component and the TCB Component Identity (TCI) of the next component, respectively. If the CDI length is insufficient (e.g., multiple seed values are overlapping) then a key derivation function (KDF) should be used to increase CDI length or the seed derivation should be salted (e.g., using NIST SP800-57 specifications).

In an example, FIG. 6 illustrates a DICE architecture with hardware (Layer–1 610) implementing the two trusted capabilities: (i) the Unique Device Secret (UDS) and (ii) the One-Way Function (OWF). The Unique Device Secret (UDS) is a one-time programmable globally unique value. Its only use is to seed a One-Way Function that, combined with a TCB Component Identifier (TCI) value, generates a symmetric secret that is specific to the layer that provided the TCI. The TCI combined with Layer 0 product ID information here identifies the TCB for Layer 0 620. The one-way function here uses the UDS to produce a keyed hash of the TCI: the CDI value. The CDI uniquely identifies the TCB for Layer 0 620. The CDI is securely installed into the Layer 0 620 environment where it serves two purposes: (i) to seed a one-way function for creating a Layer 1 630 symmetric secret, and (ii) to seed a device identity generation function. For example, $f()_{OWF}$ could be an RSA key generation function where the CDI is used to seed its random number generator. The $CDI_{L0}$ thus provides an asymmetric unique identifier for Layer 0 620 that may be suitable for a variety of user defined deployment usages. The TCB for Layer 1 630 is identified using the Firmware Security Descriptor (FSD) which is the firmware hash component of the one-way function (i.e. $f(\ )_{OWF}$) found in the Layer 0 TCB that computes the Layer 1 symmetric secret used to seed the key generation function ($f(\ )_{ALIAS}$) function that generates AliasID L1 that uniquely identifies the TCB for Layer 1 630. This continues onward to use with Layer n.

As generalization of this DICE architecture layering: a particular Layer's TCB identity (TCB Component Identifier, or $TCI_{Ln}$) may be considered as a Current TCB Context (CTC), while that particular layer's unique TCB identity may be known as a Previous TCB Context (PTC) because it captures the TCB layering dependency from the previous layer. Although the lowest level of the hardware (Layer−1) TCB does not have a previous layer dependency, a trusted hardware value (e.g., a UDS) provides uniqueness. Thus, subsequent layers each rely on a respective previous TCB layer to provide a one-way function that inspects the current (to be instantiated) layer CTC and the unique PTC identifier to produce the current layer's unique identifier. The PTC identifier value propagates both the platform uniqueness property (inherited from the UDS), layer uniqueness (UDS+ CTC) and layer sequence property; which is the combination of all prior $f(\ )_{OWF}$ functions.

Figure 7A:
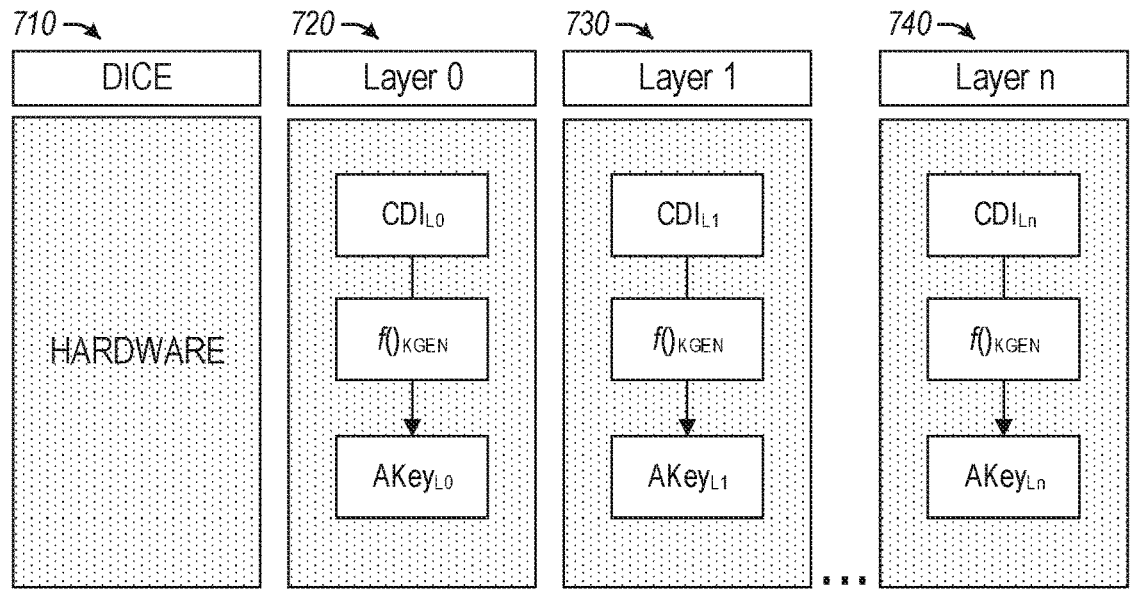
FIGS. 7A and 7B illustrate security operations performed in a layered TCB with asymmetric and symmetric keys, according to an example.
Figure 7B:
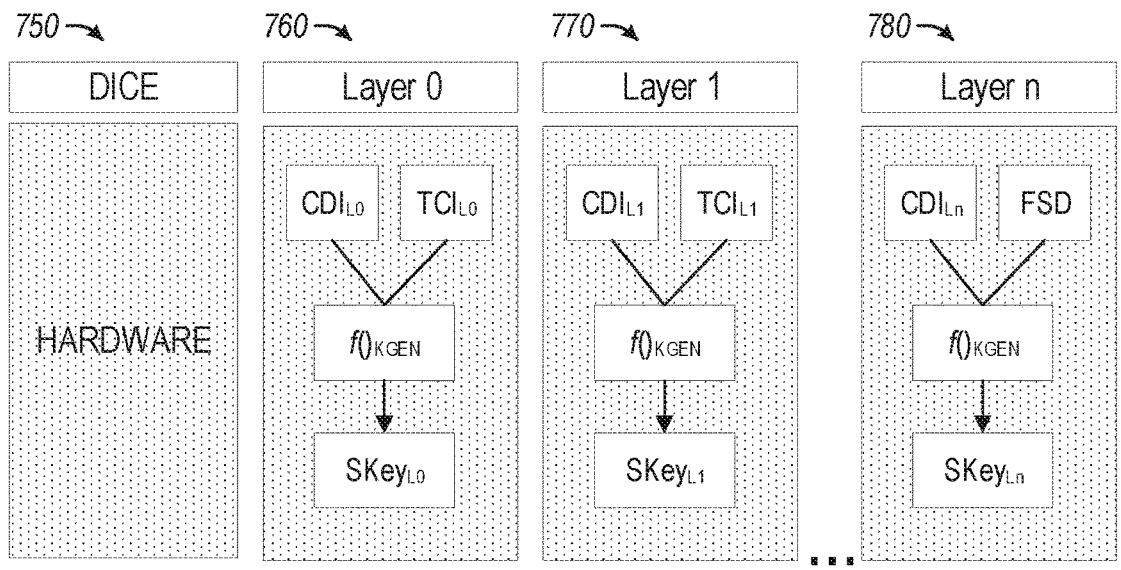

FIGS. 7A and 7B illustrate security operations performed in a layered TCB for the generation of asymmetric and symmetric keys. In FIG. 7A, asymmetric keys can be used to attest trustworthiness properties of a TCB layer. If implicit attestation is used, the key generation function must be deterministic based on the CDI. In FIG. 7B, Symmetric key creation uses a Key Derivation Function (KDF), and the UDS, or a CDI value derived using the UDS, must be used to seed the KDF.

As shown in FIG. 7A, the generation of asymmetric keys may be performed at each of the operational layers 0-n, with such keys being based on previous TCB contexts. For example, layer 0 720 uses the CDI value it received from the DICE hardware layer 710 to generate a layer 0 key (asymmetric key $AKey_{L0}$); layer 1 730 uses the CDI value it receives from layer 0 720 to generate a layer 1 key (asymmetric key $AKey_{L1}$); layer n 740 uses the CDI value it received from layer n−1 to generate a layer n key (asymmetric key $AKey_{Ln}$); and the like.

Further, in the context of FIG. 7B, a layered TCB context may also provide an input to the key generation function at each layer. For example, layer 0 760 uses the CDI value it received from the DICE hardware layer 750 and a TCB component identifier of the layer 0 760 to generate a layer 0 key (symmetric key $SKey_{L0}$); layer 1 770 uses the CDI value it receives from layer 0 760 and a TCB component identifier of the layer 1 770 to generate a layer 1 key (symmetric key $SKey_{L1}$); layer n 780 uses the CDI value it received from layer n−1 and a TCB component identifier of the layer n 780 to generate a layer n key (symmetric key $SKey_{Ln}$); and the like. The length of CDI must be sufficient to ensure derived symmetric keys do not cryptographically overlap the CDI seed value, or, the CDI value is augmented with additional information that ensures cryptographic overlap is avoided.

Figure 8:
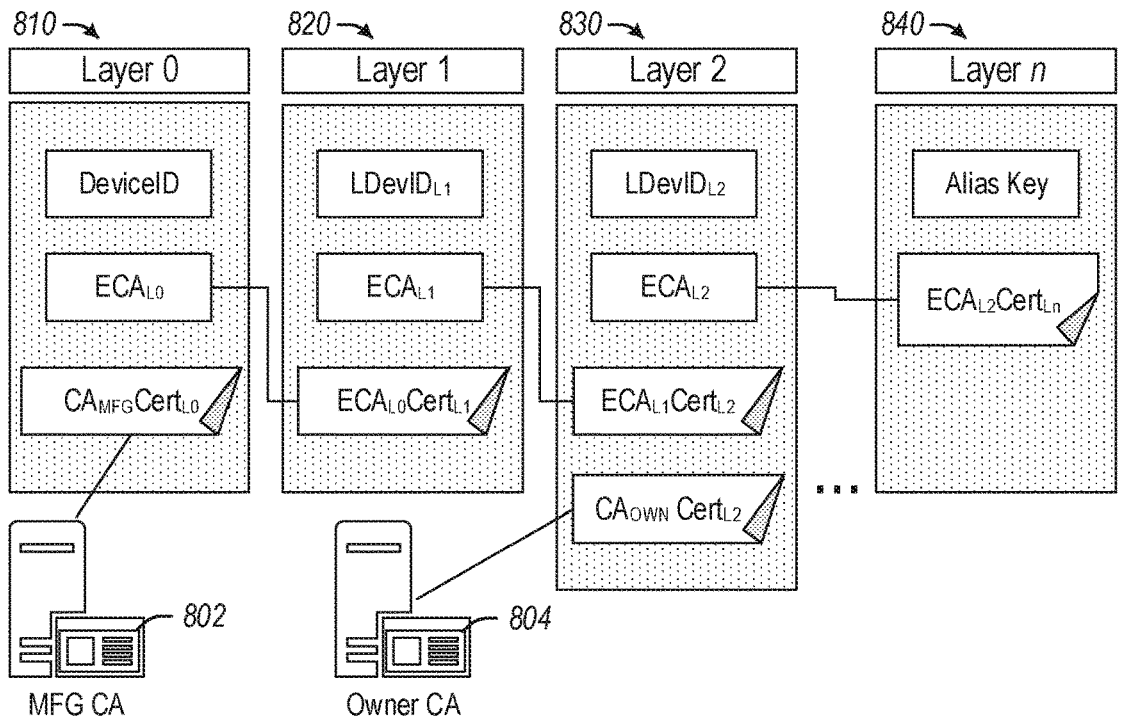
FIG. 8 illustrates certification in a layered TCB, according to an example.

FIG. 8 depicts a scenario of a layered certification based on use of an embedded certificate authority. In the layered enrollment example in FIG. 8 each TCB layer (Layer 0 810, Layer 1 820, Layer 2 830, Layer n 840) has generated a layer specific DeviceID. In this example, Layer 0 810 has obtained a manufacturing certificate ($CA_{MFG}Cer_{iL0}$) that can be used as a platform initial device identity; for instance, an IDevID obtained a manufacturing certificate ($CA_{MFG}Cert_{L0}$) from a manufacturer certificate authority 802, that can be used as a platform initial device identity (an IDevID). Layer 0 810 implements an embedded certificate authority ($ECA_{L0}$) that was used to issue a certificate ($ECA_{L0}Cert_{L1}$) to the TCB of Layer 1 820. Layer 1 820 also implements an ECA, that was used to issue a layer 2 certificate ($ECA_{L1}Cert_{L2}$). The platform owner certificate authority 804 in turn issued a local device identity (LDevID) certificate to the TCB of Layer 2 830 ($CA_{OWN}Cert_{L2}$). The TCB of Layer 2 830 implements an ECA that was used to issue a certificate to the next layer (on to Layer n 840).

Figure 9:
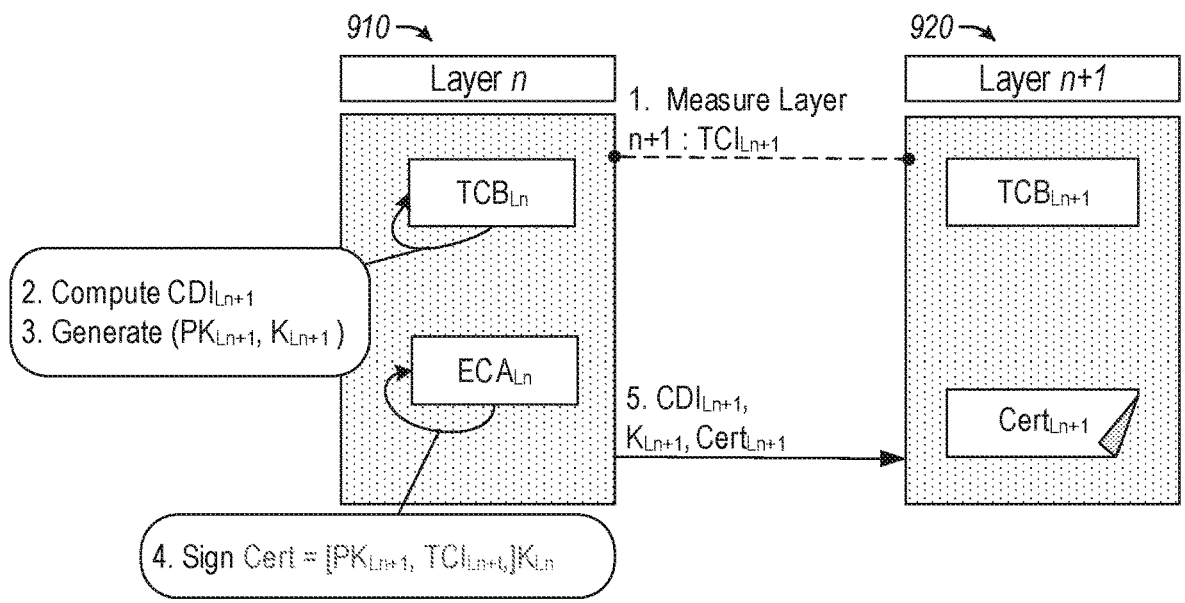
FIG. 9 illustrates certification in a layered TCB by an embedded certificate authority, according to an example.
Figure 10:
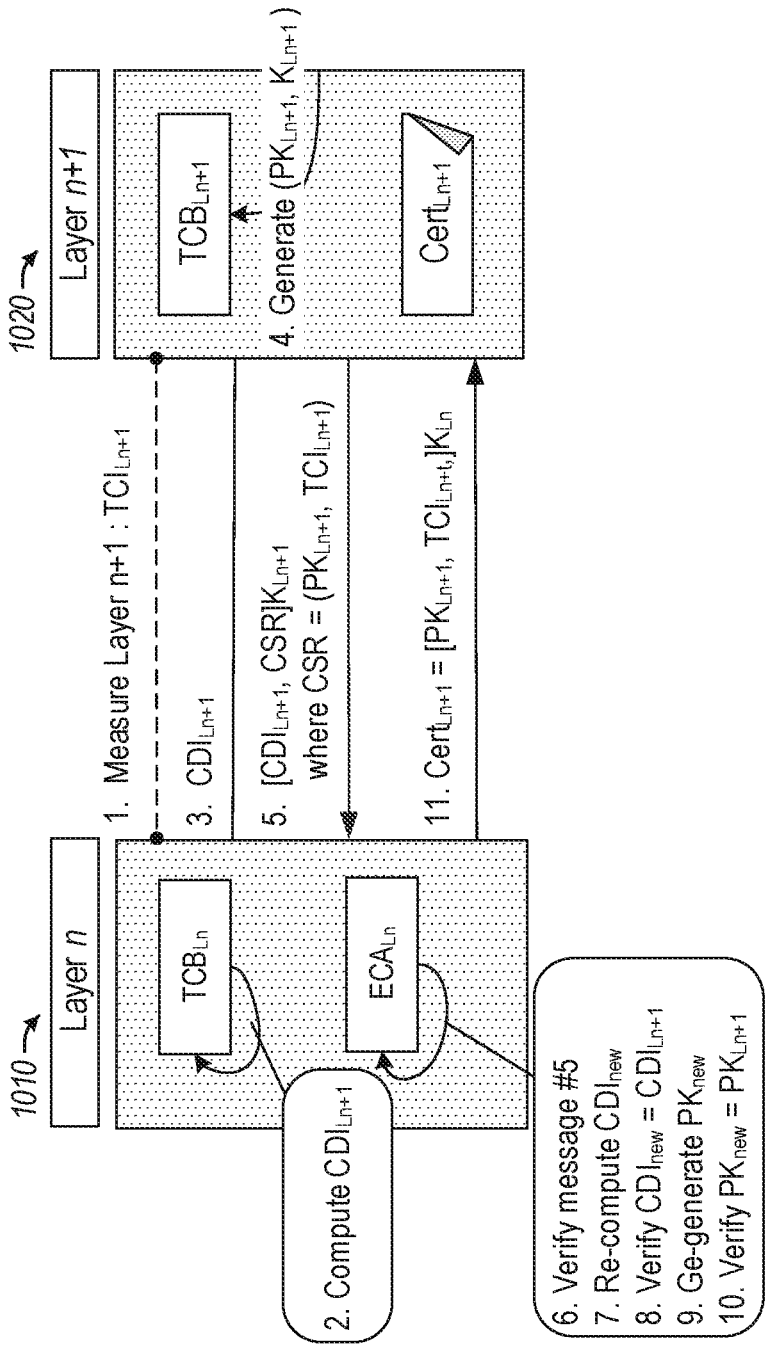
FIG. 10 illustrates enrollment and certification in a layered TCB by a certificate signing request, according to an example.

FIGS. 9 and 10 further depicts scenarios for certification using an Embedded Certificate Authority (ECA). An ECA allows a current layer TCB to issue a certificate that extends trust to a higher layer TCB. There may be two models used for intra-layer certification: (i) the ECA policy prescribes when and how to issue higher layer certificates (shown in FIG. 9); or, (ii) a higher layer creates a Certificate Signing Request (CSR) (shown in FIG. 10).

FIG. 9 illustrates a Direct Layered Certification, using a certificate provided by an ECA. The ECA may issue certificates according to a policy that is embedded in the ECA firmware or is securely configured. The policy describes how and when to issue layer specific certificates.

In an example, the ECA generates the to-be-certified key pair and authorizes ECA certificate issuance. The ECA may securely provision the key pair to the higher layer TCB (e.g., Layer n+1 920) for a particular layer (e.g., Layer n 910) or may allow the key to be accessed by the higher layer TCB over a secure channel.

FIG. 10 illustrates a Layered TCB Certification using a CSR. An ECA may accept certificate enrollment requests from a higher layer TCB. The ECA must verify the CSR originates from the TCB component named in the CSR Subject. For example, a CSR may be accompanied by a layer attestation that proves layering semantics to the ECA or the CSR arrives over a trusted communication path.

In an example, the Enrollment steps may begin with Layer n+1 1020 constructing a CSR including its DeviceID public key ($PK_{Ln+1}$) and its TCB context ($TCI_{Ln+1}$), which at a minimum identifies the TCB layer and may contain additional attributes. The CSR specifies the type of certificate requested. The ECA of Layer n 1010 must validate or re-obtain the $TC_{Ln+1}$ value to detect possible changes to TCB layer identity since the time of initial layer instantiation.

The ECA should require attestation evidence to prove that expected layering dynamics exists. For example, the CDI value that was securely (confidentiality protected) supplied to Layer n+1 as part of layer instantiation is securely supplied to the ECA for evaluation. Layer n+1 can also sign the CDI value authenticating the CDI to the ECA.

The ECA verifies the CSR by verifying the signature was created by the Layer n+1 private key ($K_{Ln+1}$). This is accomplished using the public key in the CSR ($PK_{Ln+1}$). The ECA can verify layering semantics by re-computing the CDI value and comparing it with the supplied (re-obtained) CDI value ($CDI_{Ln+1}$). The ECA issues an ECA certificate replacing the CSR signature with its own ($K_{Ln}$). The layer specific TCB must determine whether the ECA is to use a dedicated ECA signing key or use an existing key such as a DeviceID key.

Figure 11A:
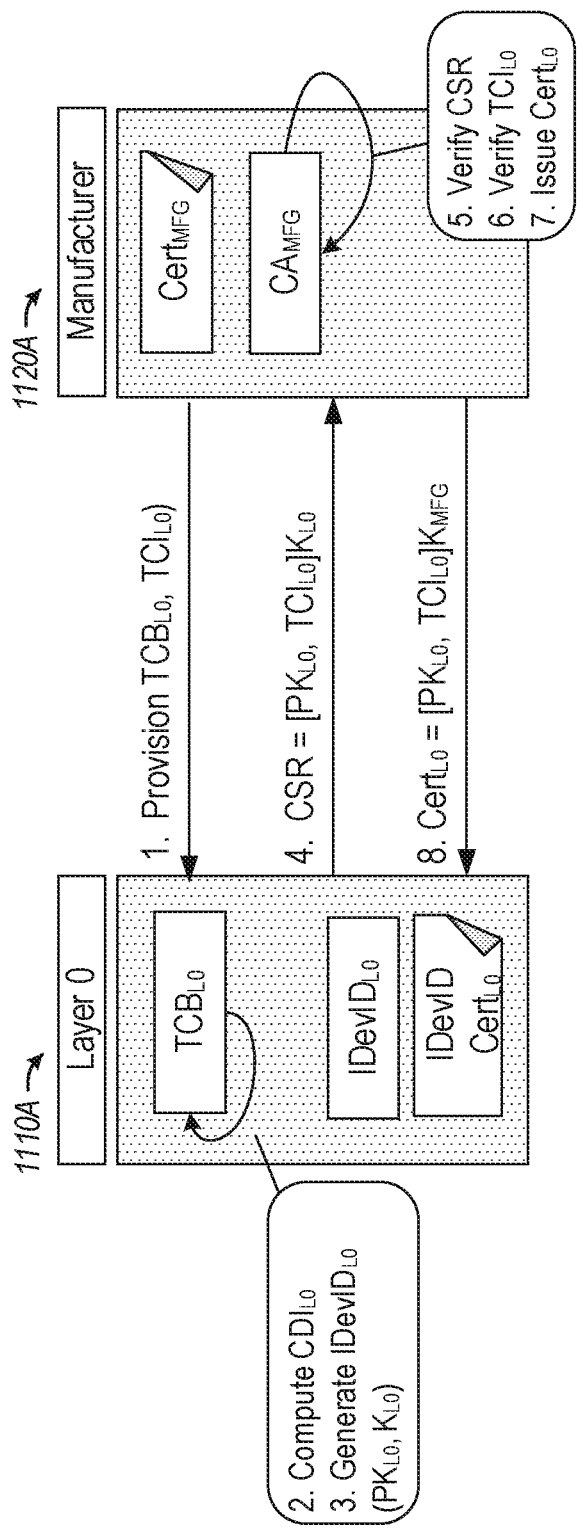
FIGS. 11A, 11B, and 11C illustrate initial identity certification techniques in a layered TCB, according to an example.
Figure 11B:
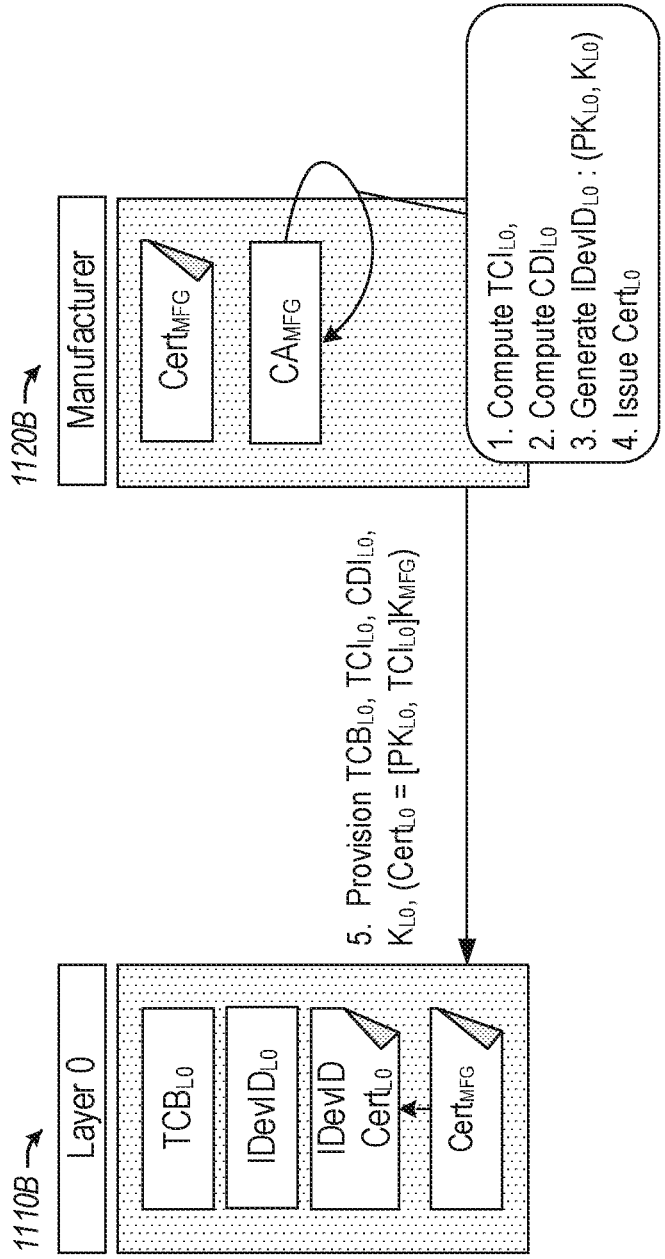
Figure 11C:
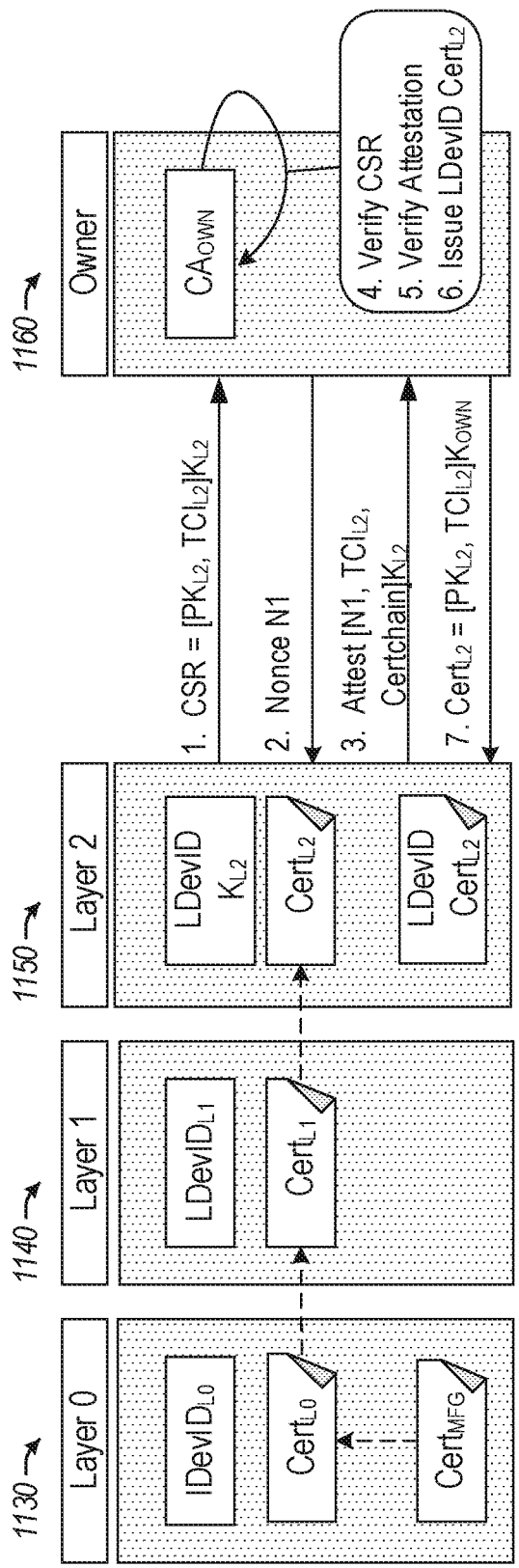

FIGS. 11A, 11B, and 11C illustrate certification with external certificate authorities. A DICE TCB layer may interact with an external CA in order to obtain device identities. Device identities may be obtained during manufacturing or later when the device is onboarded into a network. Device manufacturers who typically provision device identities during manufacturing generally follow one of two approaches: (i) both the device keys and device identity credential are provisioned to the device while in a non-operational state or (ii) the device keys are generated by the device and the identity credential is created in response to a credential creation request from the device.

FIG. 11A depicts an example initial device identity (IDevID) certification by a manufacturer, through the use of a Manufacturer-issued IDevID certificate (generated by manufacturer 1120A) with device generated keys (generated at Layer 0 1110A). This addresses a scenario for initial device identity creation when the provisioning device isn't trusted to protect device secret keys. A traditional certificate signing request (CSR) is self-signed by the private portion of the device identity key (e.g., KL0) to prove to the registration entity (e.g., CA) that it possesses the private key. However, self-signing doesn't attest the security properties employed to protect the private key. For this an additional attestation message is required.

In the scenario of FIG. 11A, a manufacturer use-only key may be used to authenticate the CSR to a manufacturer tester/CA. Also, the manufacturing processes may involve provisioning of firmware that helps perform these and other provisioning steps, which then may be removed from the provisioned device. Thus, the particular approach to provisioning becomes part of the attested claims of the device.

FIG. 11B depicts an example initial device identity (IDevID) certification by a manufacturer, through the use of a Manufacturer Issued IDevID Certificate with Provisioned Keys implemented at a layer (Layer 0 1110B). The manufacturing certificates issued by the manufacturing CA (e.g., $CA_{MFG}$, generated by manufacturer 1120B) may contain additional information or implied semantics relating to attestation attributes. Alternatively, the manufacturer and supply chain entities may issue attribute certificates or reference manifests.

FIG. 11C depicts an example device identity certification by an owner certificate authority, through the use of an Owner Issued LDevID Certificate. This example helps describe a "local" device identity certification use case of a layered TCB. The use cases for 'owner' can be varied. An owner might be an OEM or OBV who wants to establish an attestable identity that authenticates the device to the OEM/OBV for FW update. Other uses cases may involve OCM, OSV, ISV or other entities that may manage a resource in the device beyond the legal owner of the device.

FIG. 11C illustrates a scenario of a device owner who may take possession of the device from a supply chain entity and issue a local device identity (e.g., LDevID, generated from Owner 1160) using a CA of the owner's choice. The owner may likewise include attestation attributes and issue attribute certificates and attestation manifests to facilitate attestation operations within the local owner's network.

The owner may determine a different device layer (e.g., Layer 2 1150) is most appropriate for operation within the owner's network. Hence, a device onboarding step might create a CSR using a local (LDevID) public key (e.g., PKL2). The device attests regarding the security of the LDevID by supplying attestation evidence of the TCB layering back to the root of trust layer (e.g., through Layer 1 1140 and Layer 0 1130). For example, the manufacturer issued certificate and embedded CA issued certificates that supplied to the owner CA for trust evaluation. The owner CA may issue local device ID certificates if attestation evidence is sufficient.

Other use cases and variations of the presently described DICE architecture and layered TCB may be applied. In an example, an extensible layered DICE architecture may be applied in an FPGA application, with important consideration to ensure resilience against attack/failure at a higher layer. This includes consideration of a hardware/memory designs, such as to include a non-repudiation requirement that Layer N−1 should not be able to snoop Layer N private keys (even if it can snoop its firmware). This may involve a TCB hardware design utilizing two types of memory, such as a portion that is not readable by any other layer and a portion that is read-only by its lower layer TCB (e.g., implemented with a policy fixed in the hardware architecture). Other variations and improvements for security or operational considerations may also be implemented in the examples above.

Other platforms (e.g., including those implementing the various layers depicted in FIG. 5, such as virtualization, embedded systems, complex operating systems) or types of hardware or architectures (e.g., Intel SGX, ARM TrustZone) may be utilized to implement the layered TCB techniques detailed above. However, the following section provides a detailed explanation of the features of Intel® Software Guard Extensions (SGX) which enable a layered TCB and use of an embedded CA using an enclave-based trusted environment.

DICE Embedded CA Using SGX.

SGX offers a type of trusted computing base where a trusted environment exists within a user process called an Enclave. The SGX TCB consists of hardware isolated memory pages, CPU instructions for creating, extending, initializing, entering, exiting and attesting the enclave and privileged CPU modes for controlling access to enclave memory. SGX takes a layered approach to TCG design where CPU hardware and microcode make up the bottom layer consisting of Enclave Page Cache (EPC), EPC Map (EPCM) and protected mode operation logic. A second layer provides SGX runtime code that includes, for example, a user or ISV supplied SGX runtime. Finally, a third layer provides enclave runtimes to dynamically load code and configuration data that further specializes enclave behavior. The three layers, together, make up a trusted subset of processes, and can operate as a platform TCB. The following examples provide an overview of an implementation to explain how the SGX platform TCB works to fulfill DICE-compliant operations.

Figure 12:
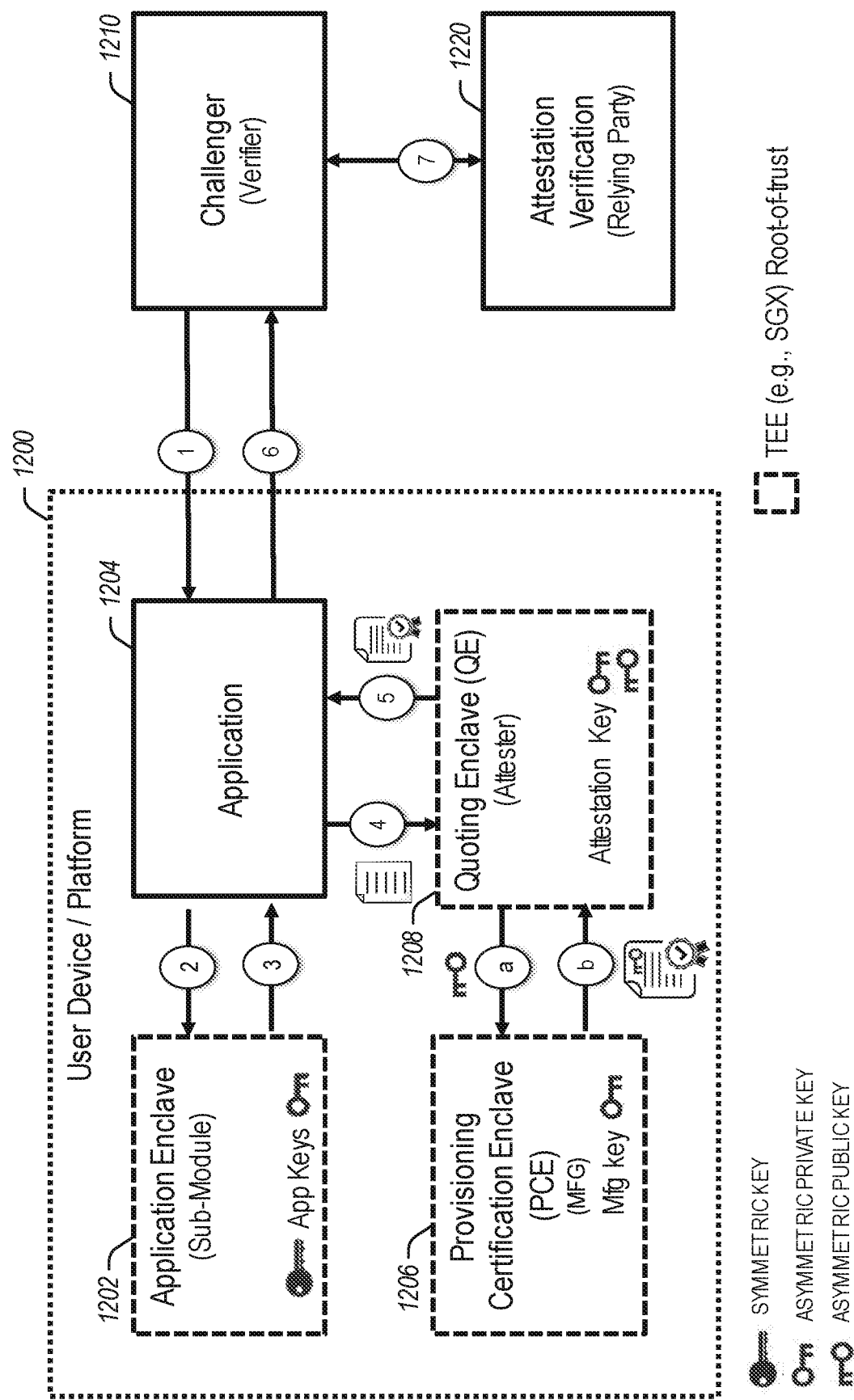
FIG. 12 illustrates an overview of secure enclave-based remote attestation components, according to an example.

FIG. 12 illustrates an overview of SGX-based remote attestation components, according to an example. Here, in a user device or platform 1200, aspects of an application enclave 1202, provisioning certification enclave 1206, and quoting enclave 1208, managed by an SGX or like hardware security component, coordinate to generate relevant security keys for attestation verification for an application 1204 of the platform 1200. For example, these enclaves and the SGX component may provide an Embedded Certificate Authority (ECA), to operate a trusted environment within an end-entity platform that performs some certificate authority operations on behalf of other environments co-located within the end-entity platform. However, enclaves 1206 and 1208 may be implemented as a Security Management Engine, Embedded Security Engine, memory controller, platform management controller, platform power controller or other IP block in an integrated circuit.

The operation of an ECA may be provided in connection with a TCG-compliant DICE verification process. The following terminology is used in the following sections in reference to this DICE verification process:

CDI—Compound Device Identifier [KDF(UDS, H(FMC))].

DICE—Device Identifier Composition Engine.

FMC—First Mutable Code. layer0 is firmware. FMC measures layer1.

FSD—Firmware Security Descriptor (layer1 firmware image).

FWID—Firmware Identity (measurement of layer1 firmware image).

Implicit Attestation (use of a DICE key implies certain attestable claims are extant).

UDS—Unique Device Secret (HW persistent random value).

Figure 13:
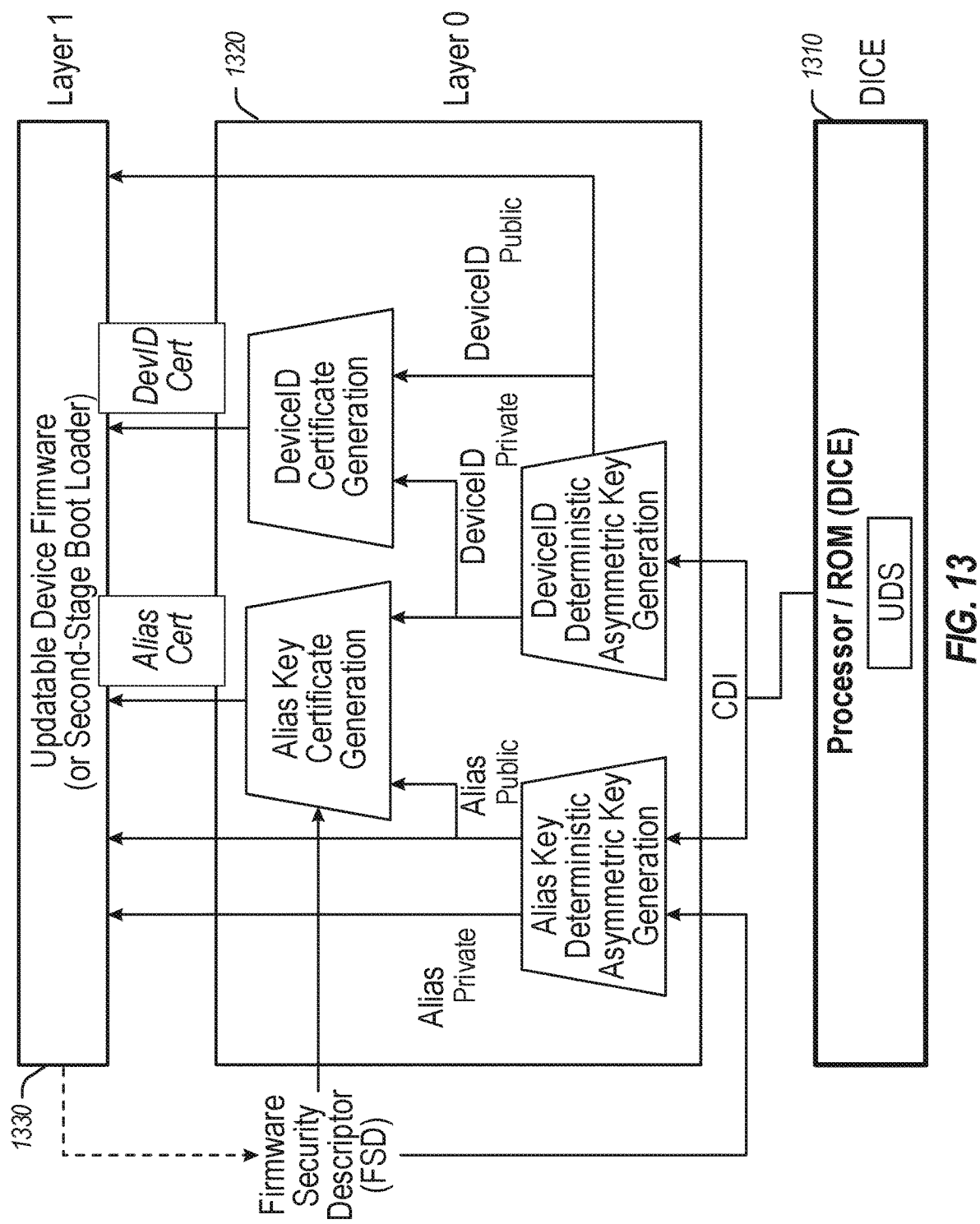
FIG. 13 illustrates details of a DICE hardware architecture, according to an example.

FIG. 13 illustrates a DICE architecture, according to an example. After POST (power-on self-test), the processor or ROM (DICE hardware 1310) measures Layer 0 (L0 1320)→FMC. After this, the DICE hardware 1310 computes CDI←KDF(UDS, H(FMC)). Then, L0 1320 measures Layer 1 (L1 1330)→FSD. Then, L0 1320 generates DeviceID, where DeviceID←KeyGen(CDI, ECDHE, . . . ). Then, L0 1320 enrolls DeviceID with Issuer (e.g., mfg), where CSR+Sign$_{DevID}$(PoP)→Mfg and Sign$_{mfg}$(CSR)→L0 1320. Then, L0 1320 generated AliasID, where AliasID←KeyGen(KDF(CDI, FSD), ECDHE, . . . ). Then, L0 1320 (as CA) issues AliasID cert, where Cert(Alias.pub, fw_id=FSD)Sign$_{DevID}$ and L0 provisions Alias.priv+ Cert$_{AIAS}$ to L1 1330. Then, L1 1330 signs nonce with Alias key to attest FSD and Alias key. The Verifier checks Alias cert signature and compares FSD to a "known good" policy. Finally, L0 1320 forgets CDI and DeviceID at power reset.

When looking at SGX and DICE there are some comparative terms that may be observed. This is illustrated in TABLE 1 below.

TABLE 1

| DICE | SGX |
|---|---|
| UDS - HW persistent random value. | FuseKey |
| CDI - KDF(UDS, H(FMC)) | EGETKEY (FuseKey, #3.) |
| FMC - First Mutable Code | MRENCLAVE or {MRSIGNER, ISVPRODID, ISVSVN} |
| FSD - layer1 firmware image. | MRENCLAVE contains FSD |
| FWID - measurement of FSD image. | {CONFIGID, CONFIGSVN} |
| Implicit Attestation - use of a DICE key implies claims are extant | Implicit Attestation - use of an Enclave key implies claims are extant Explicit Attestation - "Report" structure is signed by an attestation key rooted to a trusted manufacturer |

Figure 14:
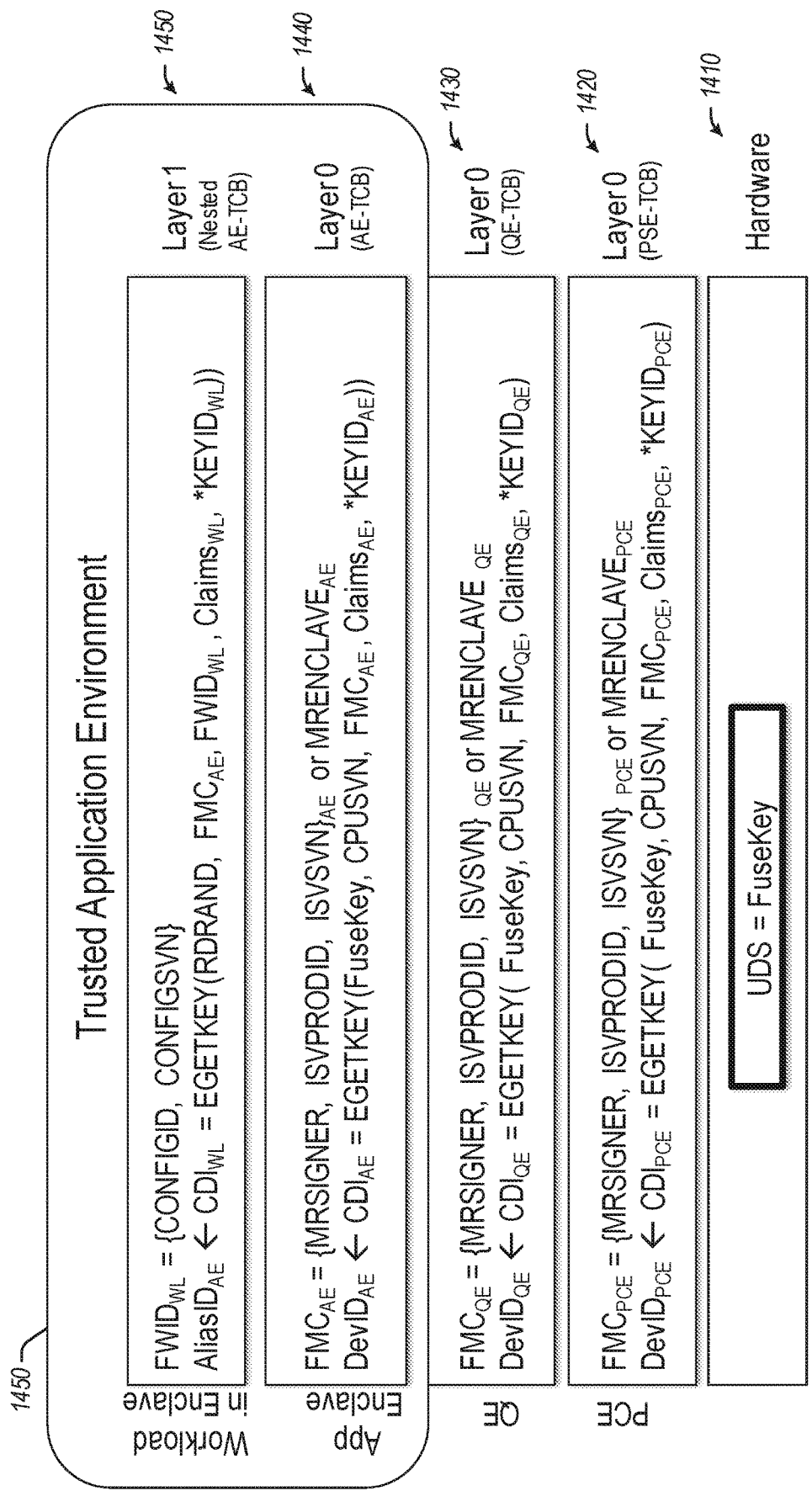
FIG. 14 illustrates a secure enclave trusted execution environment architecture, according to an example.

FIG. 14 illustrates an SGX architecture, according to an example. This architecture may be represented in terms of including multiple layers beneath layer 0 as shown in FIG. 14. For example, there could be multiple processors at a hardware layer-2 that connect to a platform hardware layer-1 (aka Hardware 1410).

As FIG. 14 illustrates, SGX and DICE are aligned in several ways:
 a. SGX CDI values derived from a HW RoT UDS (in HW 1410, supporting higher layers 1420, 1430, 1440, 1450)
 b. SGX CDI does not require secure storage.
 c. SGX CDI can be used to derive Alias key(s).
 d. Implicit attestation of enclave exists when SGX CDI is used to generate asymmetric key pairs.
 e. SGX CDI could (in theory) support DICE symmetric key attestation.

As further illustrated in FIG. 14, SGX and DICE differ in that:
 a. SGX does not require boot-loader layering.
 b. SGX has a well-defined TCB and supports TCB layering. DICE does not define a TCB.
 c. SGX supports IDevID/LdevID use cases.
 d. SGX supports explicit attestation use cases.

Figure 17:
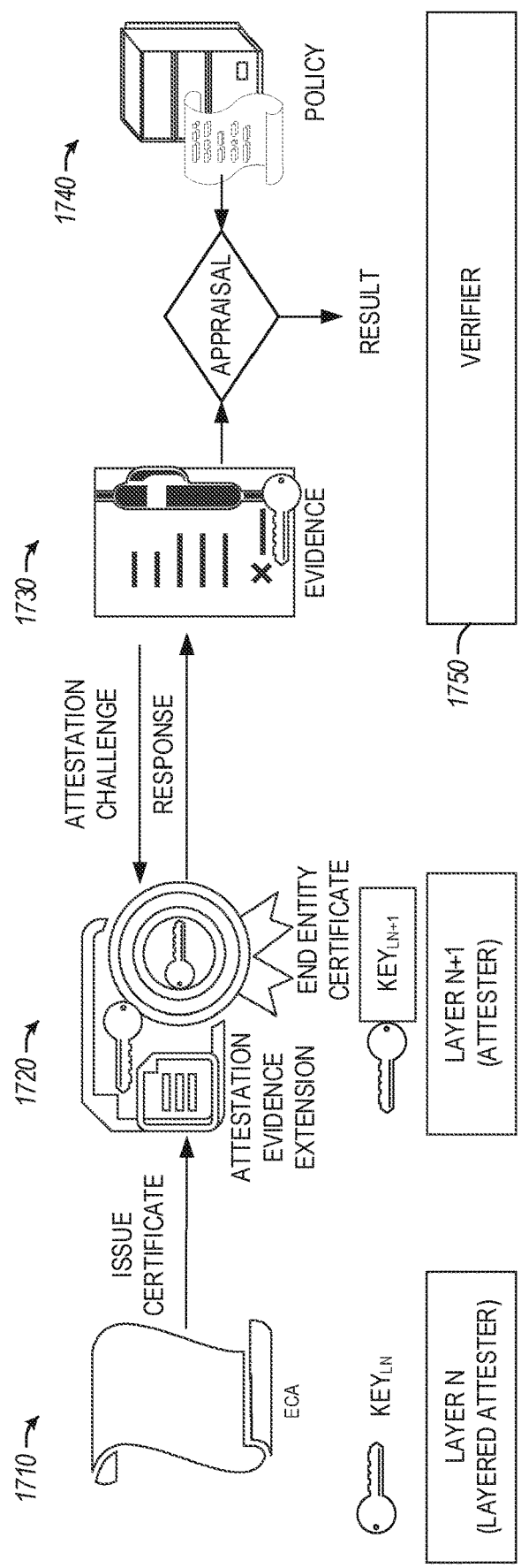
FIG. 17 illustrates an attestation evidence scenario based on implementing the extensible layered trusted computing base techniques discussed herein, according to an example.

In the context of FIG. 14, the workload/applet 1450 may be combined with 1440 layer 0 and be regarded as a multi-component layer 0 entity. Thus, a single certificate/credential may be issued for both components. The attestation evidence corresponding to both components 1440 and 1450 may be included with the same certificate/credential such that a verifier of the credential may infer that both 1440 and 1450 are co-resident in the same layer environment. Additionally, the vendors supplying firmware/software for 1440 and 1450 may differ while being known to a Verifier (the entity that reads the layer credential—as illustrated in FIG. 17).

In an example, the seed created by the HW (layer−1) using EGETKEY (in FIG. 14) for a layer 1, layer 2, . . . layer n entity may not be shared with a layer n−1 (e.g. layer between the top layer and the HW layer 1410). As a result, the intermediate layers may not be able to masquerade as a layer above by generating a key that belongs with a different layer.

Figure 15:
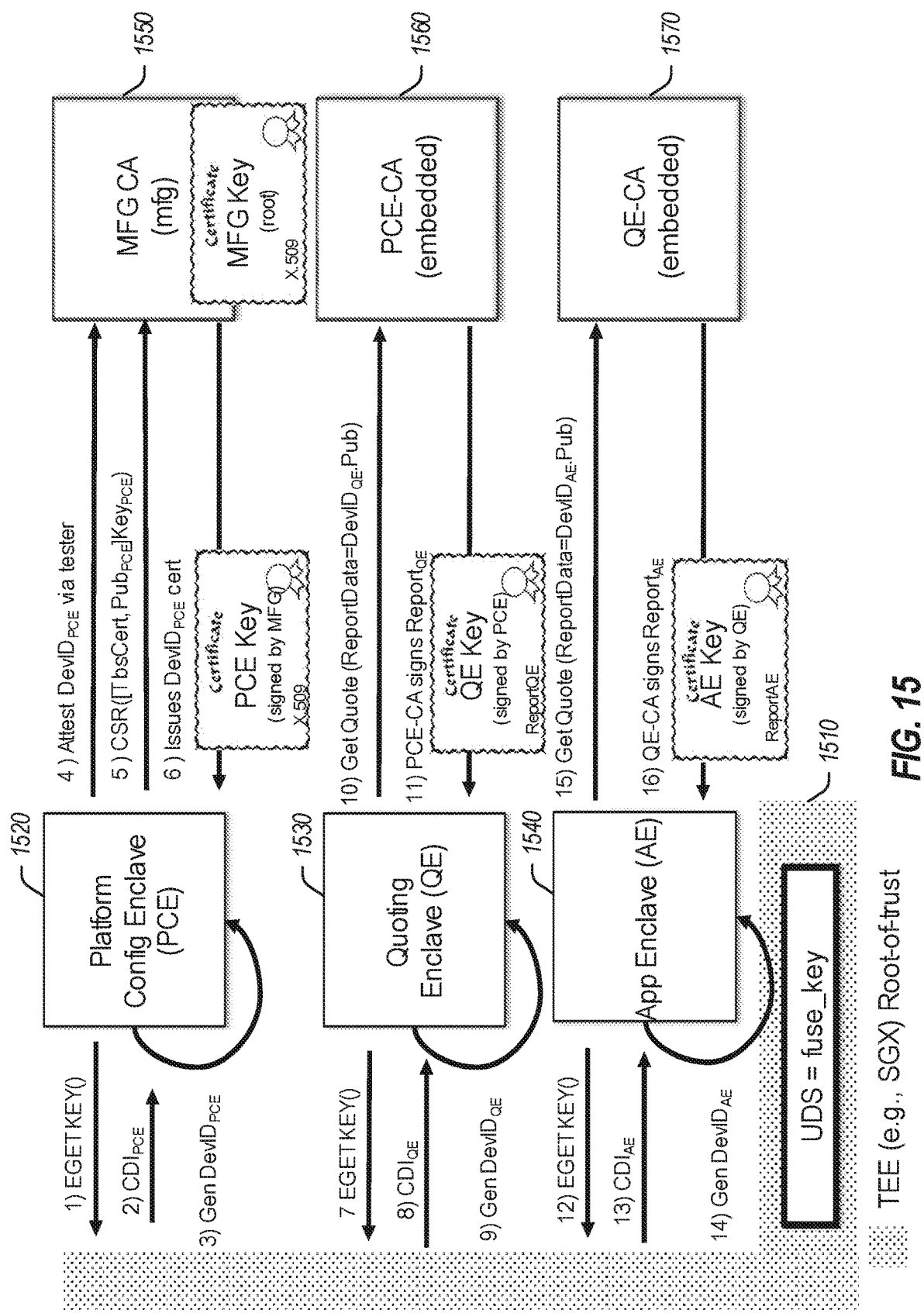
FIG. 15 illustrates a secure enclave embedded certificate authority certification, according to an example.

FIG. 15 illustrates SGX embedded certificate authority certification, according to an example. As illustrated in FIG. 15, SGX support for an IDevID/LDevID model (operating in the TEE root of trust 1510, with support from CAs 1550, 1560, 1570) includes:
 a. PCE 1520 DevID is similar to 802.1AR IDevID
 b. AE 1540 DevID is similar to 802.1AR LDevID
 c. PCE 1520 attests DevID$_{QE}$ originated from QE 1530
 d. QE 1530 attests DevID$_{AE}$ originated from AE 1540.
 e. SGX is silent about non-enclave environments on the same platform.

Figure 16:
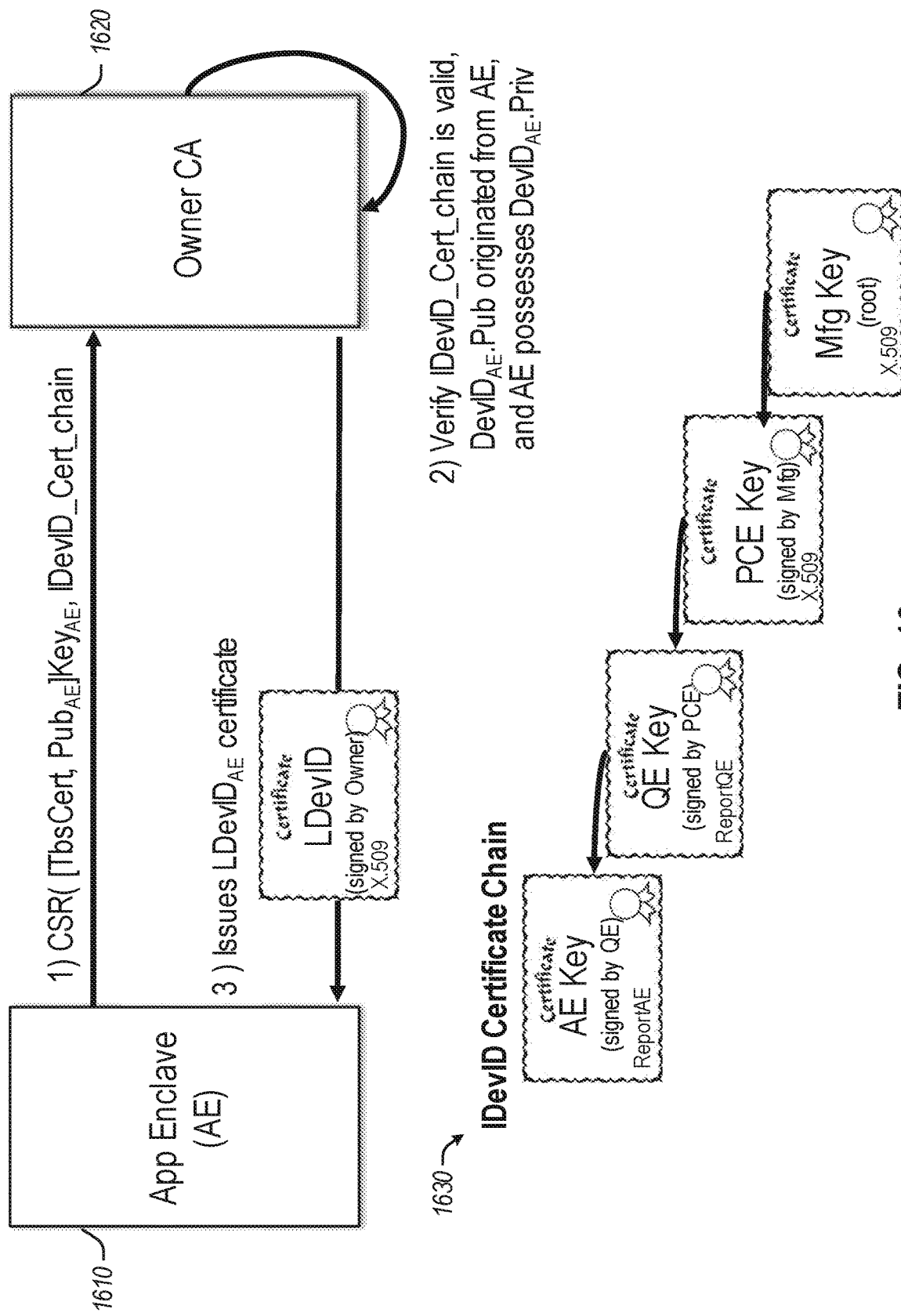
FIG. 16 illustrates a secure enclave local identity creation and certification, according to an example.

DICE also supports IDevID/LDevID model in:
 a. DeviceID is similar to 802.1 AR IDevID
 b. Alias key is similar to 802.1AR LDevID except Alias key is mutable.
 c. DeviceID implicitly attests Alias key FIG. 16 illustrates SGX local identity creation and certification, according to an example. As shown in FIG. 16, enclave enrollment includes:
 a. AE environment is the "device"
 b. AE 1610 enrolls a local identity (LDevID) as part of being "onboarded" into the owner's environment
 c. QE is dynamically enrolled by extending the manufacturers IDevID context (via the Owner CA 1620 and the IDevID certificate chain 1630).
 d. Owner CA needs to parse SGX "Report" structure in order to validate the trust dependency graph Thus, FIG. 16 shows a signing/issuing layering dependency which can differ from a seed provisioning layering dynamic. This highlights different trustworthiness vectors where signing vector asserts layering in terms of an execution flow (e.g. bootstrap processing) vs. a seed provisioning vector that asserts layering in terms of a seed derivation hierarchy which is the foundation to a key hierarchy. Separating these two trust vectors allows for separation of trust semantics that allows for improved hardening and protection of assets associated with each vector.

In further examples, certificate extensions for manifests and profiles may be defined for different certificate types, in the context of a DICE architecture and the layered TCB/hardware root of trust environment discussed above.

In an example, a Device ID provided by a certificate extension may enable Device manufacturers, OEMs or other entities in a supply chain to issue DeviceID certificates using an external CA. For instance, in an example applicable to DICE, the following certificate profile properties and conventions may be defined to apply to initial DeviceID (IDevID) certificates:

TABLE 2

| Field Name | Contents |
| --- | --- |
| Issuer | MUST identify or chain to the device manufacturer/supply chain entity that issues the certificate. If the Issuer is an embedded CA then the ECA issuer MUST chain to the manufacturer CA. |
| Subject | MUST identify the TCB owning the IDevID private key. The Subject name may be a class identifier implying there may be other device instances sharing the same name. |
| Subject Public Key Info | Contains the public key and algorithm identifier that is protected by an immutable TCB layer or a TCB layer that SHALL be modifiable only by the Issuer (as per [1]). |
| Key Usage | If Subject is an ECA then this field MUST contain keyCertSign and MUST NOT contain cRLSign. Otherwise MUST NOT contain keyCertSign. |
| Extended Key Usage | This field may contain any appropriate values for the usage model, e.g., id-kp-clientAuth for clients. |
| Basic Constraints | If Subject is an ECA then this field MUST contain cA:TRUE and pathLengthConstraint as appropriate. Otherwise the certificate SHOULD NOT contain BasicConstraints. |
| Policy OIDs | MUST contain id-tcg-kp-identityInit, may contain id-tcg-kp-eca, id-tcg-kp-attestInit. |
| Attestation Extensions | A future TCG specification may address attestation extensions. |

In a further example applicable to DICE, the following Layered TCB, LDevID or alias TCB identity certificates may be issued by an ECA or an external CA with the following properties and constraints:

TABLE 3

| Field Name | Contents |
| --- | --- |
| Issuer | MUST identify or chain to the owner CA. If the Issuer is an embedded CA then the ECA issuer MUST chain to the owner CA. |
| Subject | See Table 2 - Subject |
| Subject Public Key Info | See Table 2 - Subject Public Key Info |
| Key Usage | See Table 2 - Key Usage |
| Extended Key Usage | See Table 2 - Extended Key Usage |
| Basic Constraints | See Table 2 - Basic Constraints |
| Policy OIDs | Must contain id-tcg-kp-identityLoc, may contain id-tcg-kp-eca, id-tcg-kp-attestLoc. |
| Assertions Extensions | See Table 2 - Attestation Extensions |

In a further example applicable to DICE, the following ECA certificates may be issued by an ECA or an external CA with the following properties and constraints:

TABLE 4

| Field Name | Contents |
| --- | --- |
| Issuer | MUST identify the CA or embedded CA that issues the certificate. The Issuer MUST ensure that the private portion of the Subject Public Key is protected by a TCB. |

TABLE 4-continued

| Field Name | Contents |
| --- | --- |
| | If Issuer is an embedded CA, then Issuer MUST identify the TCB instance that issues this certificate. |
| Subject | MUST identify the TCB containing ECA functionality. |
| Subject Public Key Info | MUST contain the current TCB Layer ECA public key and algorithm identifier. |
| Key Usage | MUST contain keyCertSign. MUST NOT contain cRLSign, may contain other KeyUsage attributes asappropriate |
| Basic Constraints | MUST contain cA:TRUE and pathLengthConstraint as appropriate |
| Policy OIDs | MUST contain id-tcg-kp-eca, may contain id-tcg-kp-attestInit, id-tcg-kp-attestLoc, id-tcg-kp-identityInit, and/or id-tcg-kp-identityLoc |
| Attestation Extensions | See Table 2 - Attestation Extensions |
| CRLDistributionPoints Extension | MUST be present. |

In a further example applicable to DICE, the following Attestation Identity certificates may be issued by an ECA or an external CA with the following properties and constraints:

TABLE 5

| Field Name | Contents |
| --- | --- |
| Issuer | MUST contain the name of the embedded CA that issues the Subject Public Key certificate. The Issuer may be an EGA (i.e., the previous TCB layer) or an external CA. If the Issuer is an ECA, the Issuer MUST identify the TCB that issues this certificate. |
| Subject | MUST identify a TCB class or instance. |
| Subject Public Key Info | MUST contain a current TCB attestation public key and algorithm identifier. |
| Key Usage | If Subject is an ECA then this field MUST contain keyCertSign and MUST NOT contain cRLSign. Otherwise MUST NOT contain keyCertSign. |
| Extended Key Usage | May contain any appropriate values for the usage model, e.g., id-kp-clientAuth for clients. |
| Basic Constraints | If Subject is an ECA then this field MUST contain cA:TRUE and pathLengthConstraint as appropriate. Otherwise the certificate SHOULD NOT contain BasicConstraints. |
| Policy OIDs | MUST contain either id-tcg-kp-attestInit or id-tcg-kp-attestLoc. |
| Attestation Extensions | See Table 2 - Attestation Extensions |

Accordingly, based on these and similar examples, it will be understood that an 'embedded' CA (ECA) can issue certificates/credentials to layers in a way that complies with existing standards and expected behaviors of traditional (non-embedded) CA operation.

TCB Info Evidence Extension

The following section provide further details on an extension that defines attestation evidence about the DICE layer that is associated with the Subject key. This information specifically indicates how attestation evidence of a layered TCB can be represented or included in a certificate.

The certificate Subject and SubjectPublicKey identifies the entity to which the DiceTcbInfo extension applies.

The AuthorityKeyIdentifier extension MUST be supplied when the DiceTcbInfo extension is supplied. This allows the Verifier to locate the signer's certificate. This extension SHOULD be included with CRL entries that revoke the certificate that originally included this extension. Inclusion of this extension is optional. However, if omitted an alternative method for conveying the DiceTcbInfo information to the Verifier must be provided. The Verifier must process this extension.

In an example, this extension for attestation evidence may be represented as follows:

TABLE 6

```
id-tcg-dice-TcbInfo OBJECT IDENTIFIER ::= {id-tcg-dice 2}
DiceTcbInfo ::== SEQUENCE {
    vendor   [0] IMPLICIT GeneralNames    OPTIONAL,
    model    [1] IMPLICIT IA5String       OPTIONAL,
    version  [2] IMPLICIT IA5String       OPTIONAL,
    svn      [3] IMPLICIT INTEGER         OPTIONAL,
    layer    [4] IMPLICIT INTEGER         OPTIONAL,
    index    [5] IMPLICIT INTEGER         OPTIONAL,
    digests  [6] IMPLICIT Fwids           OPTIONAL,
    flags    [7] IMPLICIT OCTETSTRING     OPTIONAL,
    prodid   [8] IMPLICIT OCTETSTRING     OPTIONAL,
}
Fwids ::== SEQUENCE SIZE (1..MAX) OF FWID
```

An explanation of these data fields is as follows:

vendor—the entity that created the DICE component.

model—the product name associated with the DICE component.

version—the revision string associated with the DICE component.

svn—the security version number associated with the DICE component.

layer—the DICE layer associated with the DICE component.

index—the enumeration of DICE component assets at a DICE layer. (It is helpful to increment this value when there are multiple keys being used by the same component).

digests—a sequence of digest values resulting from applying the hashAlg function over the firmware values used to compute a CDI value. It is computed by the DICE layer associated with the certificate Issuer key.

flags—a vendor supplied value that encodes model-specific device state.

prodid—a product identifier associated with the DICE component.

In an example, multiple vendors may contribute attestation evidences for a single TCB, even as each TCB has its own certificate. This may be represented as follows:

TABLE 7

```
id-tcg-dice-MultiTcbInfo OBJECT IDENTIFIER ::= {id-tcg-dice 6 }
DiceTcbInfoSeq ::= SEQUENCE SIZE (1..MAX) OF DiceTcbInfo
FWID ::== SEQUENCE {
    hashAlg    OBJECT IDENTIFIER,
    fwid       OCTET STRING
}
```

In this example, the 'digests' attribute may be a list of hash values where the hash value itself can be used to look up a record in a database that contains metadata and other data describing what values, when digested, produces this fwid value. This may operate similar to a Distributed Hash Table (DHT). Another possibility is the FWID structure will be updated to include a tag that identifies a database entry that does the same thing. For example, the tag could be a URI, URL, URN, OID or other identifier.

EXAMPLES

FIG. 17 illustrates an attestation evidence scenario based on the various extensible layered trusted computing base techniques discussed herein. The Attestation Evidence for a layer n+1 environment 1720 may be contained in a credential that certifies a key used by layer n+1 where the authority (CA) that issues the credential may be an embedded service, function, TCB, security module, TEE, FPGA, CPU, CPU mode or other layer n computing environment that receives execution control before the layer n+1 environment 1720. The layer n environment 1710 may also authorize or control flow of execution thread to the layer n+1 environment 1720.

Additionally, the layer n environment may invoke other layer n-m environments that have preceded the layer n environment in execution. The layer n-m environments may also have included Attestation Evidence in the layer n credential such that a verifier/appraiser 1750 may evaluate the evidence 1730 according to a set of known good values and policies 1740. Furthermore, the layer n-m environment may be a 'root' or anchor environment where there is no layer beneath it.

Figure 18:
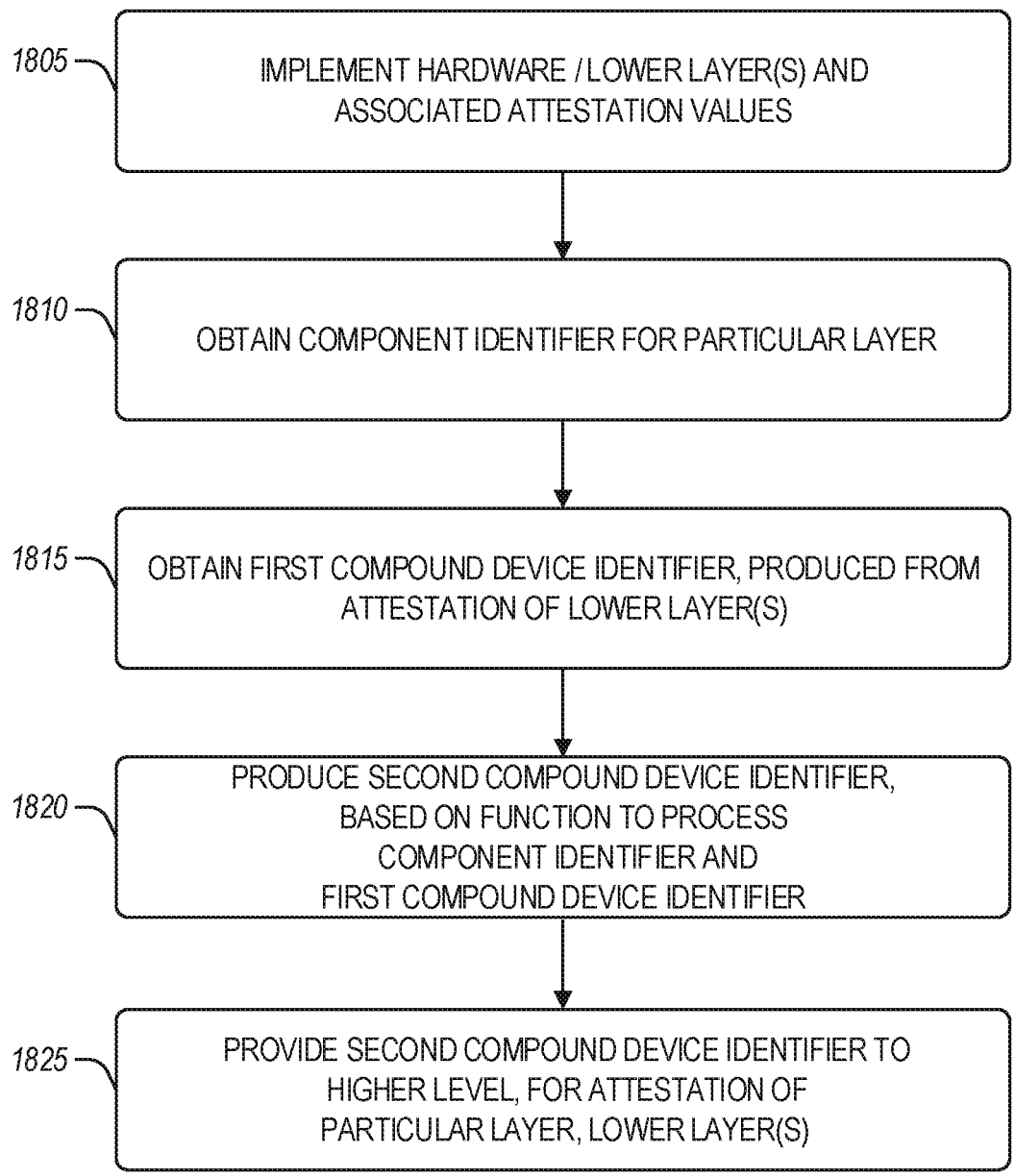
FIG. 18 illustrates a flowchart of operations for implementing an extensible layered trusted computing base, according to an example.

FIG. 18 illustrates a flowchart 1800 of operations for implementing an extensible layered trusted computing base, according to an example. These operations are described from the perspective of a computing device (e.g., network node, edge server, IoT module, etc.) or processing components of such computing device (e.g., a system-on-a-chip, circuitry, etc.), having trusted hardware circuitry implementing a hardware layer, and processing circuitry implementing at least one operational layer (e.g., firmware and software layers), although it will be understood that other perspectives or devices may be implemented. Further, it will be understood that other circuitry or components (e.g., as described with reference to FIGS. 3 and 4, such as relating to networking, processing, memory, storage, etc.) may also be involved with the following operations.

The flowchart 1800 begins with an operation to implement hardware (and other lower layers) and associated attestation values (operation 1805), such as with use of the trusted hardware circuitry. This operation is depicted in FIG. 6 with the use of layer 610. In an example, the hardware layer includes components that are structured according to a Device Identifier Composition Engine (DICE) architecture. Also, in an example, the hardware circuitry provides hardware for secure execution of a trusted execution environment (e.g., SGX) from the hardware layer, as the processing circuitry is configured to execute instructions to provide the trusted execution environment using the particular layer.

The flowchart 1800 continues with an operation to obtain a component identifier for a particular layer of the at least one operational layer (operation 1810). This and the following operations are depicted in FIG. 6 with the use of layer 620. This particular operational layer (and other operational layers of the at least one operational layer) may provide an implementation of firmware instructions or software instructions with the processing circuitry. In an example, the component identifier of the particular layer is a TCB component identifier, such as from a component identifier that is unique to a TCB component in the particular layer. Various examples of TCB components and identifiers are discussed in the examples above.

The flowchart 1800 continues with an operation to obtain a first compound device identifier (operation 1815), which is provided from one or more attestation values produced at one or more lower layers (e.g., produced from one or more layers that are located lower than the particular operational layer, such as the hardware and lower layers, or just the hardware layer, in operation 1805). For instance, the lower layer(s) may provide an OWF result of identifiable attributes of the lower layer TCB (the "TCI", discussed above). The current layer TCI is what is input with the CDI of the previous layer to form the current layer CDI. In an example, the first compound device identifier of the layer lower than the particular layer (the "lower layer") is provided only from the (lowest) hardware layer, and the first compound device identifier of the layer lower than the particular layer is generated based on a unique device secret used to seed a one-way function at the hardware layer.

The flowchart 1800 then continues with an operation to produce a second compound device identifier (operation 1820), based on a function to process to the component identifier for the particular layer (such as at operation 1810) and the first compound device identifier (such as at operation 1815). This second compound device identifier may be provided to a higher level based on: (i) a compound identifier of the layer lower than the particular layer, and (ii) a component identifier unique to the particular layer. In a further example, the function is a cryptographic pseudo-random function, and the function accepts the component identifier from the particular layer as a seed value, and the first compound device identifier of the layer lower than the particular layer as a data value.

The flowchart 1800 concludes with an operation to provide the second compound device identifier to a higher level (above the particular layer), as applicable, for the attestation of the particular layer and lower layers below the particular layer (operation 1825). This may continue for the attestation and verification at higher operational layers, repeating the operations 1810-1820.

Additional examples of the presently described method, system, and device embodiments include the following, non-limiting configurations described in the claims. Each of the following non-limiting examples may stand on its own, or may be combined in any permutation or combination with any one or more of the other examples provided below or throughout the present disclosure.

Example 1 is a computing device (e.g., networked computer system, edge computing node, etc.), comprising: trusted hardware circuitry, configured to implement a hardware layer; and processing circuitry, configured to securely implement at least one operational layer, based on attestation of the hardware layer, the processing circuitry configured to perform operations to: obtain a component identifier from a particular layer of the at least one operational layer; obtain a first compound device identifier, produced as an attestation value, and produced at a layer lower than the particular layer; and process, with a function, the component identifier from the particular layer and the first compound device identifier from the layer lower than the particular layer, to produce a second compound device identifier; wherein the second compound device identifier indicates attestation of at least one layer, implemented with the processing circuitry, located at or below the particular layer.

In Example 2, the subject matter of Example 1 optionally includes the processing circuitry configured to: provide the second compound device identifier to a higher layer of the at least one operational layer, located above the particular layer, for attestation of layers including the particular layer, the layer lower than the particular layer, and the hardware layer.

In Example 3, the subject matter of any one or more of Examples 1-2 optionally include subject matter where the hardware layer includes components that are structured according to a Device Identifier Composition Engine (DICE) architecture.

In Example 4, the subject matter of Example 3 optionally includes subject matter where the first compound device identifier of the layer lower than the particular layer is provided from the hardware layer, wherein the first compound device identifier of the layer lower than the particular layer is generated based on a unique device secret used to seed a one-way function at the hardware layer.

In Example 5, the subject matter of any one or more of Examples 1-4 optionally include subject matter where the hardware circuitry provides hardware for secure execution of a trusted execution environment from the hardware layer, and wherein the processing circuitry is configured to execute instructions to provide the trusted execution environment using the particular layer.

In Example 6, the subject matter of any one or more of Examples 1-5 optionally include subject matter where the at least one operational layer includes respective layers for implementation of firmware instructions and software instructions with the processing circuitry.

In Example 7, the subject matter of any one or more of Examples 1-6 optionally include subject matter where the component identifier of the particular layer is a trusted computing base component identifier, and wherein the component identifier is unique to a trusted computing base component in the particular layer.

In Example 8, the subject matter of any one or more of Examples 1-7 optionally include subject matter where the second compound device identifier of the particular layer is a compound device identifier based on: (i) a compound identifier of the layer lower than the particular layer, and (ii) a component identifier unique to the particular layer.

In Example 9, the subject matter of any one or more of Examples 1-8 optionally include subject matter where the function is a cryptographic pseudo-random function, wherein the function accepts the component identifier from the particular layer as a seed value, and the first compound device identifier of the layer lower than the particular layer as a data value.

Example 10 is at least one machine-readable storage medium comprising instructions stored thereupon, which when executed by processing circuitry of a computing system, cause the processing circuitry to perform operations comprising: obtaining a component identifier from a particular layer of at least one operational layer of the computing system; obtaining a first compound device identifier, produced as an attestation value, and produced at a layer lower than the particular layer; and processing, with a function, the component identifier from the particular layer and the first compound device identifier from the layer lower than the particular layer, to produce a second compound device identifier; wherein the second compound device identifier indicates attestation of at least one layer, implemented with the processing circuitry, located at or below the particular layer.

In Example 11, the subject matter of Example 10 optionally includes the operations further comprising: providing the second compound device identifier to a higher layer of the at least one operational layer, located above the particular layer, for attestation of layers including the particular layer and the lower layer.

In Example 12, the subject matter of any one or more of Examples 10-11 optionally include subject matter where the at least one operational layer is implemented based on attestation of a hardware layer of the computing system, and wherein the hardware layer includes components that are structured according to a Device Identifier Composition Engine (DICE) architecture.

In Example 13, the subject matter of Example 12 optionally includes subject matter where the first compound device identifier of the layer lower than the particular layer is provided from the hardware layer, wherein the first compound device identifier of the layer lower than the particular layer is generated based on a unique device secret used to seed a one-way function at the hardware layer.

In Example 14, the subject matter of any one or more of Examples 12-13 optionally include subject matter where the hardware layer provides secure execution of a trusted execution environment, and wherein the processing circuitry is configured to execute instructions to provide the trusted execution environment using the particular layer.

In Example 15, the subject matter of any one or more of Examples 10-14 optionally include subject matter where the at least one operational layer includes respective layers for implementation of firmware instructions and software instructions with the processing circuitry.

In Example 16, the subject matter of any one or more of Examples 10-15 optionally include subject matter where the component identifier of the particular layer is a trusted computing base component identifier, and wherein the component identifier is unique to a trusted computing base component in the particular layer.

In Example 17, the subject matter of any one or more of Examples 10-16 optionally include subject matter where the second compound device identifier of the particular layer is a compound device identifier based on: (i) a compound identifier of the layer lower than the particular layer, and (ii) a component identifier unique to the particular layer.

In Example 18, the subject matter of any one or more of Examples 10-17 optionally include subject matter where the function is a cryptographic pseudo-random function, wherein the function accepts the component identifier from the particular layer as a seed value, and the first compound device identifier of the layer lower than the particular layer as a data value.

Example 19 is a method for establishing attestation among multiple operational layers of a computing device, comprising operations performed by processing circuitry of the computing device, the operations comprising: obtaining a component identifier from a particular layer of at least one operational layer of the computing device; obtaining a first compound device identifier, produced as an attestation value, and produced at a layer lower than the particular layer; and processing, with a function, the component identifier from the particular layer and the first compound device identifier from the layer lower than the particular layer, to produce a second compound device identifier; wherein the second compound device identifier indicates attestation of at least one layer, implemented with the processing circuitry, located at or below the particular layer.

In Example 20, the subject matter of Example 19 optionally includes the operations further comprising: providing the second compound device identifier to a higher layer of the at least one operational layer, located above the particular layer, for attestation of layers including the particular layer and the lower layer.

In Example 21, the subject matter of any one or more of Examples 19-20 optionally include subject matter where the at least one operational layer is implemented based on attestation of a hardware layer of the computing device, and wherein the hardware layer includes components that are structured according to a Device Identifier Composition Engine (DICE) architecture.

In Example 22, the subject matter of Example 21 optionally includes subject matter where the first compound device identifier of the layer lower than the particular layer is provided from the hardware layer, wherein the first compound device identifier of the layer lower than the particular layer is generated based on a unique device secret used to seed a one-way function at the hardware layer.

In Example 23, the subject matter of any one or more of Examples 21-22 optionally include subject matter where the hardware layer provides secure execution of a trusted execution environment, and wherein the processing circuitry is configured to execute instructions to provide the trusted execution environment using the particular layer.

In Example 24, the subject matter of any one or more of Examples 19-23 optionally include subject matter where the at least one operational layer includes respective layers for implementation of firmware instructions and software instructions with the processing circuitry.

In Example 25, the subject matter of any one or more of Examples 19-24 optionally include subject matter where the component identifier of the particular layer is a trusted computing base component identifier, and wherein the component identifier is unique to a trusted computing base component in the particular layer.

In Example 26, the subject matter of any one or more of Examples 19-25 optionally include subject matter where the second compound device identifier of the particular layer is a compound device identifier based on: (i) a compound identifier of the layer lower than the particular layer, and (ii) a component identifier unique to the particular layer.

In Example 27, the subject matter of any one or more of Examples 19-26 optionally include subject matter where the function is a cryptographic pseudo-random function, wherein the function accepts the component identifier from the particular layer as a seed value, and the first compound device identifier of the layer lower than the particular layer as a data value.

Example 28 is an apparatus, comprising: means for obtaining a component identifier from a particular layer of at least one operational layer of the apparatus; means for obtaining a first compound device identifier, produced as an attestation value, and produced at a layer lower than the particular layer; and means for processing, with a function, the component identifier from the particular layer and the first compound device identifier from the layer lower than the particular layer, to produce a second compound device identifier; wherein the second compound device identifier indicates attestation of at least one layer located at or below the particular layer.

In Example 29, the subject matter of Example 28 optionally includes the operations further comprising: means for providing the second compound device identifier to a higher layer of the at least one operational layer, located above the particular layer, for attestation of layers including the particular layer and the lower layer.

In Example 30, the subject matter of any one or more of Examples 28-29 optionally include means for implementing the at least one operational layer based on attestation of a hardware layer of the apparatus, wherein the hardware layer includes components that are structured according to a Device Identifier Composition Engine (DICE) architecture.

In Example 31, the subject matter of Example 30 optionally includes means for generating the first compound device identifier of the layer lower than the particular layer using the hardware layer, wherein the first compound device identifier of the layer lower than the particular layer is generated based on a unique device secret used to seed a one-way function at the hardware layer.

In Example 32, the subject matter of any one or more of Examples 30-31 optionally include means for implementing secure execution of a trusted execution environment, using the hardware layer; and means for implementing the trusted execution environment using the particular layer.

In Example 33, the subject matter of any one or more of Examples 28-32 optionally include subject matter where the at least one operational layer includes respective layers for implementation of firmware instructions and software instructions.

In Example 34, the subject matter of any one or more of Examples 28-33 optionally include subject matter where the component identifier of the particular layer is a trusted computing base component identifier, and wherein the component identifier is unique to a trusted computing base component in the particular layer.

In Example 35, the subject matter of any one or more of Examples 28-34 optionally include means for generating the second compound device identifier of the particular layer as a compound device identifier based on: (i) a compound identifier of the layer lower than the particular layer, and (ii) a component identifier unique to the particular layer.

In Example 36, the subject matter of any one or more of Examples 28-35 optionally include means for implementing the function with a cryptographic pseudo-random function, wherein the function accepts: the component identifier from the particular layer as a seed value, and the first compound device identifier of the layer lower than the particular layer as a data value.

Example 37 is at least one non-transitory machine-readable storage medium comprising instructions or stored data which may be configured into instructions, wherein the instructions, when configured and executed by processing circuitry of a computing device, cause the processing circuitry to perform any of the operations of Examples 1 to 36.

Example 38 is one or more computer-readable storage media comprising data to cause an electronic device, upon loading, execution, configuration, or provisioning of the data by one or more processors or electronic circuitry of the electronic device, to perform one or more elements of operations described in or related to any of Examples 1 to 36, or any other method or process described herein.

Example 39 is an apparatus comprising logic, modules, or circuitry to perform one or more elements of a method described in or related to any of Examples 1 to 36, or any other method or process described herein.

Example 40 is a method, technique, or process as described in or related to any of Examples 1 to 36, or portions or parts thereof.

Example 41 is an apparatus comprising: one or more processors and one or more computer readable media comprising instructions that, when executed by the one or more processors, cause the one or more processors to perform the method, techniques, or process as described in or related to any of Examples 1 to 36, or portions thereof.

Example 42 is a device for processing communication as described in or related to any of Examples 1 to 36, or as otherwise shown and described herein.

Example 43 is a network comprising respective devices and device communication mediums for performing any of the operations of Examples 1 to 36, or as otherwise shown and described herein.

Example 44 is a device fog implementation comprising processing nodes and computing units adapted for performing any of the operations of Examples 1 to 36, or as otherwise shown and described herein.

Example 45 is an Internet of Things (IoT) network configuration comprising respective communication links, communication circuitry, or processing circuitry for performing any of the operations of Examples 1 to 36, or as otherwise shown and described herein.

Example 46 is an edge computing system implementation comprising processing nodes and computing units adapted for performing any of the operations of Examples 1 to 36, or as otherwise shown and described herein.

Example 47 is an edge cloud computing device implementation comprising processing nodes and computing units adapted for performing any of the operations of Examples 1 to 36, or as otherwise shown and described herein.

Example 48 is an apparatus comprising means to implement of any of Examples 1 to 47.

Example 49 is a system to implement of any of Examples 1 to 47.

Example 50 is a method to implement of any of Examples 1 to 47.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
    trusted hardware circuitry, configured to implement a hardware layer; and
    processing circuitry, configured to securely implement at least one operational layer, wherein attestation of trustworthiness properties in the at least one operational layer is based on attestation of the hardware layer, and wherein the at least one operational layer includes one or both of:
        at least one firmware layer implemented with firmware instructions on the processing circuitry; or
        at least one software layer implemented with software instructions on the processing circuitry;
    wherein the processing circuitry is configured to perform operations to:
        obtain a component identifier from a particular layer of the at least one operational layer, wherein the component identifier is a unique value generated by the particular layer;
        obtain a first compound device identifier, wherein the first compound device identifier is generated by a layer lower than the particular layer as an attestation value; and
        generate, with a cryptographic function, a second compound device identifier based on the component identifier generated by the particular layer and the first compound device identifier generated by the layer lower than the particular layer;
    and wherein the second compound device identifier indicates attestation of trustworthiness properties of at least one layer of the at least one operational layer, implemented with the processing circuitry, the at least one layer located at or below the particular layer.

2. The computing device of claim 1, the processing circuitry further configured to perform operations to:
    provide the second compound device identifier to a higher layer of the at least one operational layer, located above the particular layer, for attestation of trustworthiness properties of layers including the particular layer, the layer lower than the particular layer, and the hardware layer.

3. The computing device of claim 1, wherein the hardware layer includes components that are structured according to a Device Identifier Composition Engine (DICE) architecture.

4. The computing device of claim 3, wherein the first compound device identifier of the layer lower than the particular layer is provided from the hardware layer, and wherein the first compound device identifier is generated based on a unique device secret used to seed a one-way function at the hardware layer.

5. The computing device of claim 1, wherein the hardware circuitry provides hardware for secure execution of a trusted execution environment from the hardware layer, and wherein the processing circuitry is configured to execute instructions to provide the trusted execution environment using the particular layer.

6. The computing device of claim 1, wherein the component identifier of the particular layer is a trusted computing base component identifier, and wherein the component identifier is unique to a trusted computing base component in the particular layer.

7. The computing device of claim 1, wherein the second compound device identifier of the particular layer is a compound device identifier that is generated by the cryptographic function based on: (i) a compound identifier of the layer lower than the particular layer, and (ii) the component identifier that is unique to the particular layer.

8. The computing device of claim 1, wherein the cryptographic function is a cryptographic pseudo-random function, and wherein the cryptographic function accepts: the component identifier from the particular layer as a seed value, and the first compound device identifier of the layer lower than the particular layer as a data value.

9. At least one non-transitory machine-readable storage medium comprising instructions stored thereupon, which when executed by processing circuitry of a computing system, cause the processing circuitry to perform operations comprising:
   obtaining a component identifier from a particular layer of at least one operational layer of the computing system, wherein the component identifier is a unique value generated by the particular layer, and wherein attestation of trustworthiness properties in the at least one operational layer is based on attestation of a hardware layer of trusted hardware circuitry of the computing system;
   obtaining a first compound device identifier, wherein the first compound device identifier is generated by a layer lower than the particular layer as an attestation value; and
   generating, with a cryptographic function, a second compound device identifier based on the component identifier generated by the particular layer and the first compound device identifier generated by the layer lower than the particular layer;
   wherein the at least one operational layer includes one or both of:
     at least one firmware layer implemented with firmware instructions on the processing circuitry; or
     at least one software layer implemented with software instructions on the processing circuitry;
   and wherein the second compound device identifier indicates attestation of trustworthiness properties of at least one layer of the at least one operational layer, implemented with the processing circuitry, the at least one layer located at or below the particular layer.

10. The at least one non-transitory machine-readable medium of claim 9, the operations further comprising: providing the second compound device identifier to a higher layer of the at least one operational layer, located above the particular layer, for attestation of trustworthiness properties of layers including: the particular layer, the layer lower than the particular layer, and the hardware layer.

11. The at least one non-transitory machine-readable medium of claim 9, wherein the hardware layer includes components that are structured according to a Device Identifier Composition Engine (DICE) architecture.

12. The at least one non-transitory machine-readable medium of claim 11, wherein the first compound device identifier of the layer lower than the particular layer is provided from the hardware layer, and wherein the first compound device identifier of the layer lower than the particular layer is generated based on a unique device secret used to seed a one-way function at the hardware layer.

13. The at least one non-transitory machine-readable medium of claim 9, wherein the hardware layer provides secure execution of a trusted execution environment, and wherein the processing circuitry is configured to execute instructions to provide the trusted execution environment using the particular layer.

14. The at least one non-transitory machine-readable medium of claim 9, wherein the component identifier of the particular layer is a trusted computing base component identifier, and wherein the component identifier is unique to a trusted computing base component in the particular layer.

15. The at least one non-transitory machine-readable medium of claim 9, wherein the cryptographic function is a cryptographic pseudo-random function, and wherein the cryptographic function accepts: the component identifier from the particular layer as a seed value, and the first compound device identifier of the layer lower than the particular layer as a data value.

16. A method for establishing attestation among multiple operational layers of a computing device, comprising operations performed by processing circuitry of the computing device, the operations comprising:
   obtaining a component identifier from a particular layer of at least one operational layer of the computing device, wherein the component identifier is a unique value generated by the particular layer, and wherein attestation of trustworthiness properties in the at least one operational layer is based on attestation of a hardware layer of trusted hardware circuitry of the computing device;
   obtaining a first compound device identifier, wherein the first compound device identifier is generated by a layer lower than the particular layer; and
   generating, with a cryptographic function, a second compound device identifier based on the component identifier generated by the particular layer and the first compound device identifier generated by the layer lower than the particular layer;
   wherein the at least one operational layer includes one or both of:
     at least one firmware layer implemented with firmware instructions on the processing circuitry; or
     at least one software layer implemented with software instructions on the processing circuitry;
   and wherein the second compound device identifier indicates attestation of trustworthiness properties of at least one layer of the at least one operational layer, implemented with the processing circuitry, the at least one layer located at or below the particular layer.

17. The method of claim 16, the operations further comprising:
provide the second compound device identifier to a higher layer of the at least one operational layer, located above the particular layer, for attestation of trustworthiness properties of layers including: the particular layer, the layer lower than the particular layer, and the hardware layer.

18. The method of claim 16, wherein the hardware layer includes components that are structured according to a Device Identifier Composition Engine (DICE) architecture.

19. The method of claim 18, wherein the first compound device identifier of the layer lower than the particular layer is provided from the hardware layer, and wherein the first compound device identifier of the layer lower than the particular layer is generated based on a unique device secret used to seed a one-way function at the hardware layer.

20. The method of claim 16, wherein the hardware layer provides secure execution of a trusted execution environment, and wherein the processing circuitry is configured to execute instructions to provide the trusted execution environment using the particular layer.

21. The method of claim 16, wherein the component identifier of the particular layer is a trusted computing base component identifier, and wherein the component identifier is unique to a trusted computing base component in the particular layer.

22. The method of claim 16, wherein the cryptographic function is a cryptographic pseudo-random function, and wherein the cryptographic function accepts: the component identifier from the particular layer as a seed value, and the first compound device identifier of the layer lower than the particular layer as a data value.

23. The at least one non-transitory machine-readable medium of claim 9, wherein the second compound device identifier of the particular layer is a compound device identifier that is generated by the cryptographic function based on: (i) a compound identifier of the layer lower than the particular layer, and (ii) the component identifier that is unique to the particular layer.

24. The method of claim 16, wherein the second compound device identifier of the particular layer is a compound device identifier that is generated by the cryptographic function based on: (i) a compound identifier of the layer lower than the particular layer, and (ii) the component identifier that is unique to the particular layer.

* * * * *